(12) United States Patent
Wakasugi

(10) Patent No.: US 6,411,393 B1
(45) Date of Patent: Jun. 25, 2002

(54) APPARATUS AND METHOD OF AUTOMATICALLY DELIVERING E-MAIL STORED IN MAIL SERVER TO ARBITRARY FACSIMILE APPARATUS

(75) Inventor: Naoki Wakasugi, Sagamihara (JP)

(73) Assignee: Ricoh Technology Research, Inc., Kanagawa-ken (JP)

(*) Notice: Subject to any disclaimer, the term of this patent is extended or adjusted under 35 U.S.C. 154(b) by 0 days.

(21) Appl. No.: 09/132,298

(22) Filed: Aug. 11, 1998

(30) Foreign Application Priority Data

Aug. 13, 1997 (JP) ............................................. 9-230515

(51) Int. Cl.7 ............................. G06F 13/00; H04N 1/00
(52) U.S. Cl. ...................... 358/1.15; 358/402; 358/403; 358/407; 709/206
(58) Field of Search ................................ 358/1.15, 402, 358/403, 407, 434, 442, 443, 468; 709/206, 238, 239, 240, 244; 379/90.01, 93.07, 93.24, 100.01, 100.08, 100.09, 100.12

(56) References Cited

U.S. PATENT DOCUMENTS

| | | | | |
|---|---|---|---|---|
| 5,513,126 A | * | 4/1996 | Harkins et al. | 709/228 |
| 5,608,786 A | * | 3/1997 | Gordon | 370/352 |
| 5,812,278 A | * | 9/1998 | Toyoda et al. | 358/402 |
| 5,826,034 A | * | 10/1998 | Albal | 709/239 |
| 5,859,967 A | * | 1/1999 | Kaufeld et al. | 713/200 |
| 5,905,777 A | * | 5/1999 | Foladare et al. | 379/90.01 |
| 6,023,700 A | * | 2/2000 | Owens et al. | 707/10 |
| 6,072,862 A | * | 6/2000 | Srinivasan | 379/100.08 |
| 6,182,118 B1 | * | 1/2001 | Finney et al. | 709/206 |

FOREIGN PATENT DOCUMENTS

WO   WO 97/10668   * 3/1997

* cited by examiner

Primary Examiner—Edward Coles
Assistant Examiner—Joseph R. Pokrzywa
(74) Attorney, Agent, or Firm—Cooper & Dunham LLP

(57) ABSTRACT

A data terminal which is coupled to a local area network and a public switched telephone network includes first and second communications devices that transmit and receive electronic mails through the local area network and facsimile image information through the public switched telephone network, respectively. The data terminal further includes a memory and a delivery controller. The memory stores a plurality of electronic-mail delivery control information sets, each information set being uniquely assigned to each user and including user identifiers necessary for the user to access a mail server and to receive electronic mails for the user, at least one facsimile number where to deliver the electronic mails, and a flag for indicating whether an electronic-mail delivery operation is required. The delivery controller controls the delivery operation, during which the data terminal accesses the mail server using the user identifiers to receive electronic mails for the user when the flag indicates the electronic-mail delivery operation is required and then the data terminal converts the electronic mails into facsimile image information. The controller then transmits the facsimile image information to at least one communications terminal that has a facsimile communications function using the at least one facsimile number included in the user identifiers.

72 Claims, 22 Drawing Sheets

FIG. 3

| ID (20a) | USER (20b) | PASSWORD (20c) | FAX NO. (20d) | INTERVAL (20e) | ON/OFF FLAG (20f) |
|---|---|---|---|---|---|
| 001 | user1 | pwd1 | 0123-4567-8901 | 300 | off |
| 002 | user2 | pwd2 | 0234-5678-9102 | 3600 | on |
| 003 | user3 | pwd3 | 0135-2468-9753 | 300 | on |
| 004 | user4 | pwd4 | 0987-6543-2100 | 300 | on |
| ... | ... | ... | ... | ... | ... |

```
Date: Fri, 17 Jan 1997 11:45]21 +0900
Message-ID:<YYYYYYYYYYYY@***.co.jp>
From: user1@***co.jp
To: NETFAX@***.co.jp (relay: 0123-4567-8901)
Subject: Report Dear Sirs, Please be informed of----------------
------------------------------------------
------------------------------------------

```
Date: Fri, 17 Jan 1997 11:45]21 +0900
Message-ID:<YYYYYYYYYYYY@***.co.jp>
From: userl@***co.jp
To: NETFAX@***.co.jp (relay: 0123-4567-8901)
Subject: Report
Mime-Version: 1.0
Content-type: text/plain; charset="ISO-2022-JP"
Content-Transfer-Encoding: 7bit XXです。
先日は、お世話になり、ありがとうございました。
あのときに打合せた件については、順調に進行中です。
また、細かい点の------------------------
------------------------------------------
------------------------------------------
------------------------------------------

以上
```

FIG. 8A
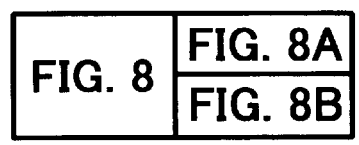
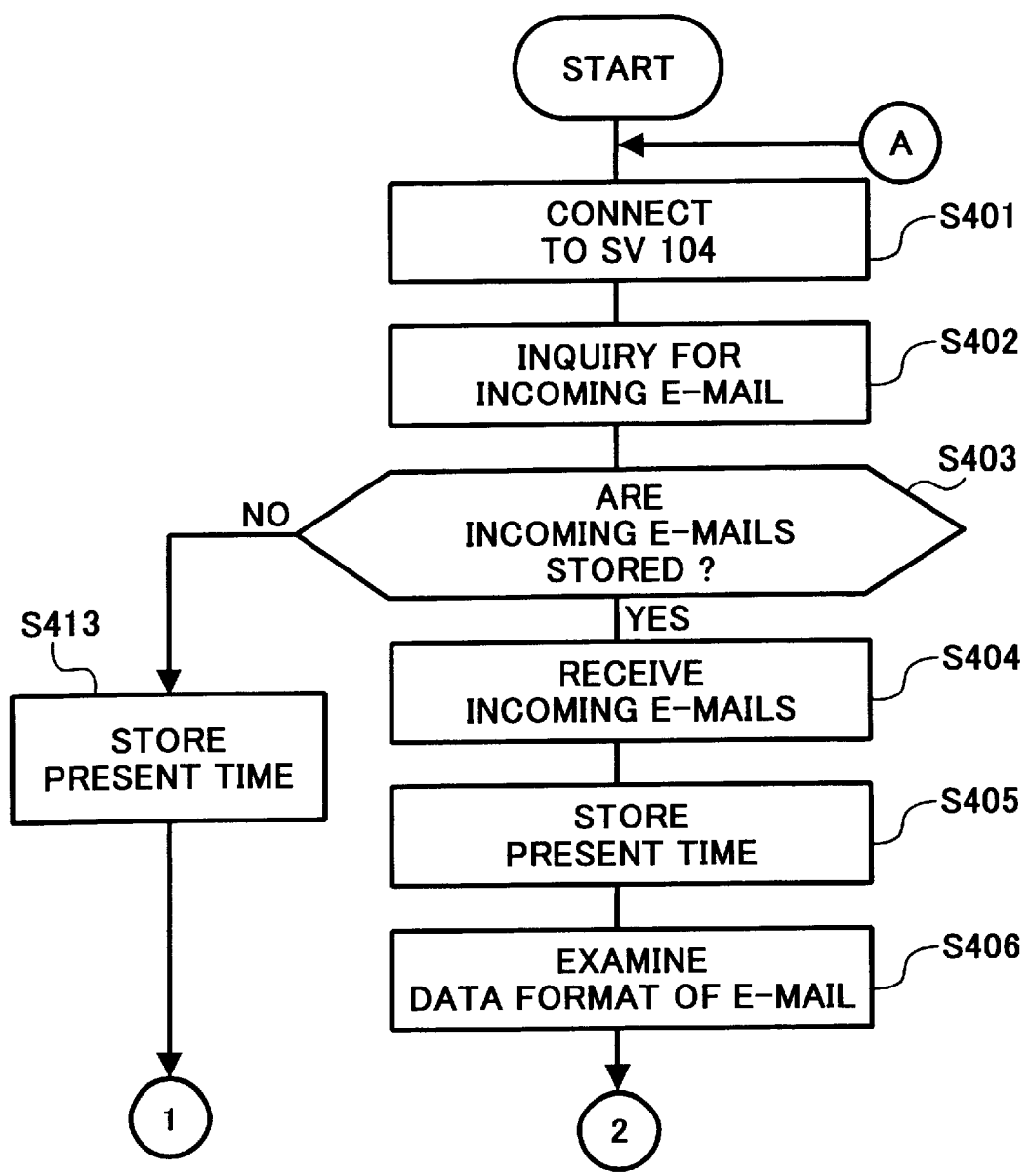

FIG. 9

| FIG. 9A |
|---------|
| FIG. 9B |

FIG. 9A

| ID (20a) | USER (20b) | PASSWORD (20c) | FAX NO. (20d) | INTERVAL (20e) | ON/OFF FLAG (20f) |
|---|---|---|---|---|---|
| 001 | user1 | pwd1 | 0123-4567-8901 | 300 | off |
| 002 | user2 | pwd2 | 0234-5678-9102 | 3600 | on |
| 003 | user3 | pwd3 | 0135-2468-9753 | 300 | on |
| 004 | user4 | pwd4 | 0987-6543-2100 | 300 | on |
| ... | ... | ... | ... | ... | ... |

| MAIL SERVER NAME | TRANSMISSION TIME | PRIORITY LEVEL | SENDER'S MAIL ADDRESS |
|---|---|---|---|
| MS#1 | 21:30 | 3 | Abc@***.com |
| MS#2 | 22:30 | 5 | N/A |
| MS#1 | 17:30 | 3 | xyz@***.co.jp |
| MS#1 | 07:30 | 1 | N/A |
| ... | ... | ... | ... |

120g 120h 120i 120j

FIG. 10A
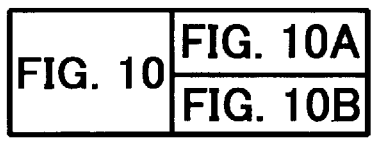
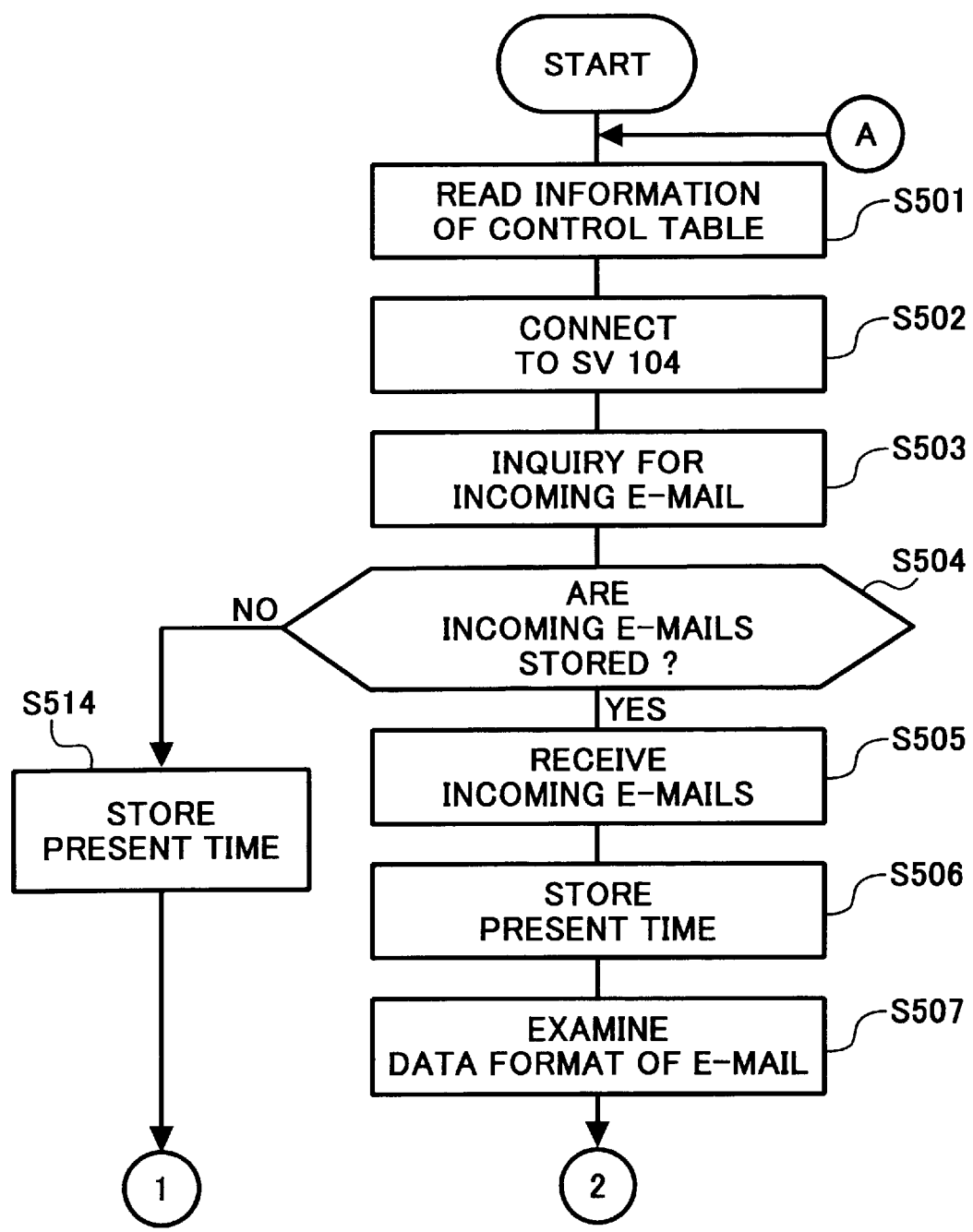

FIG. 11A
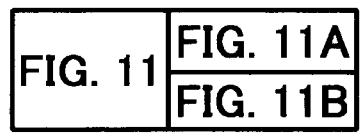
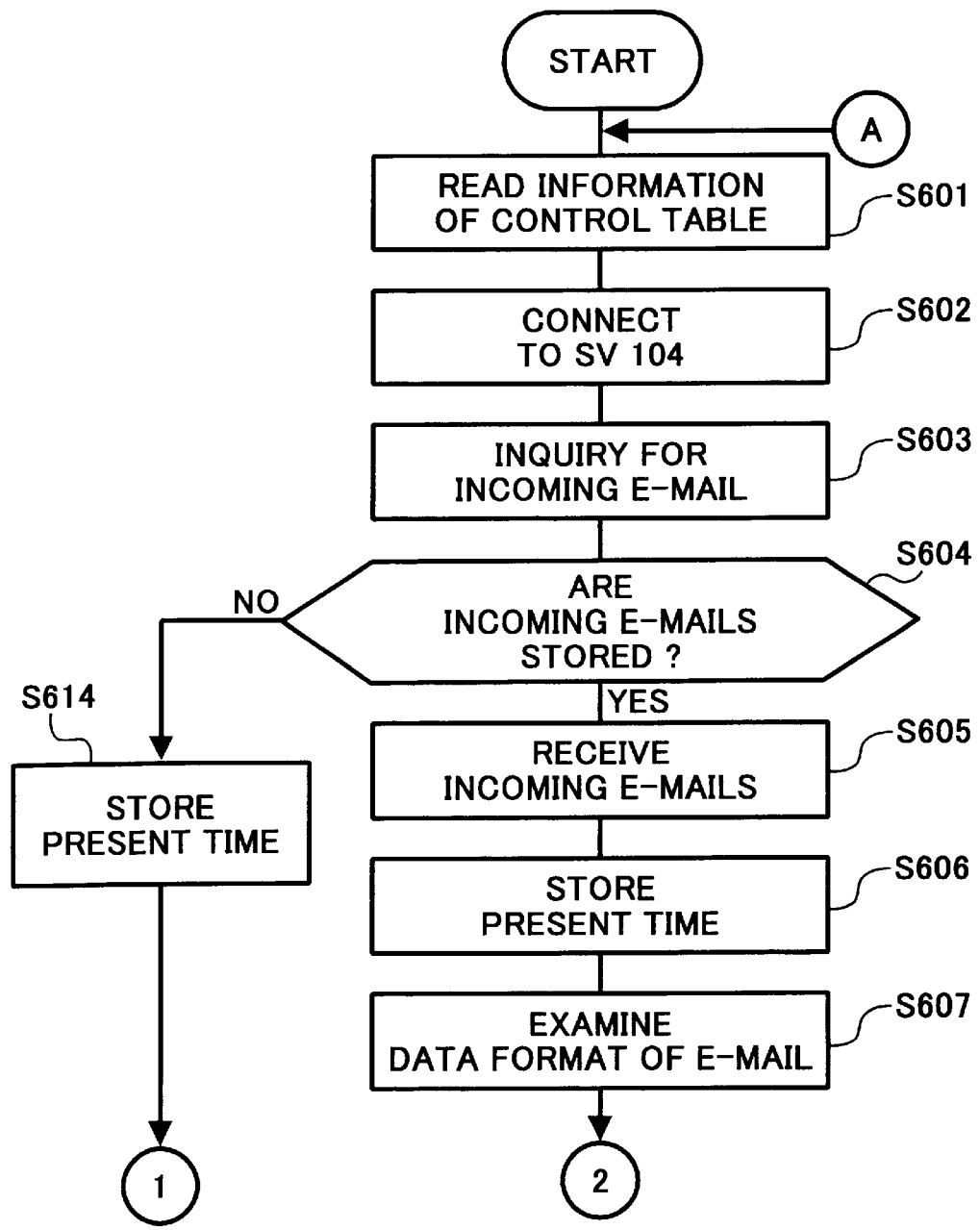

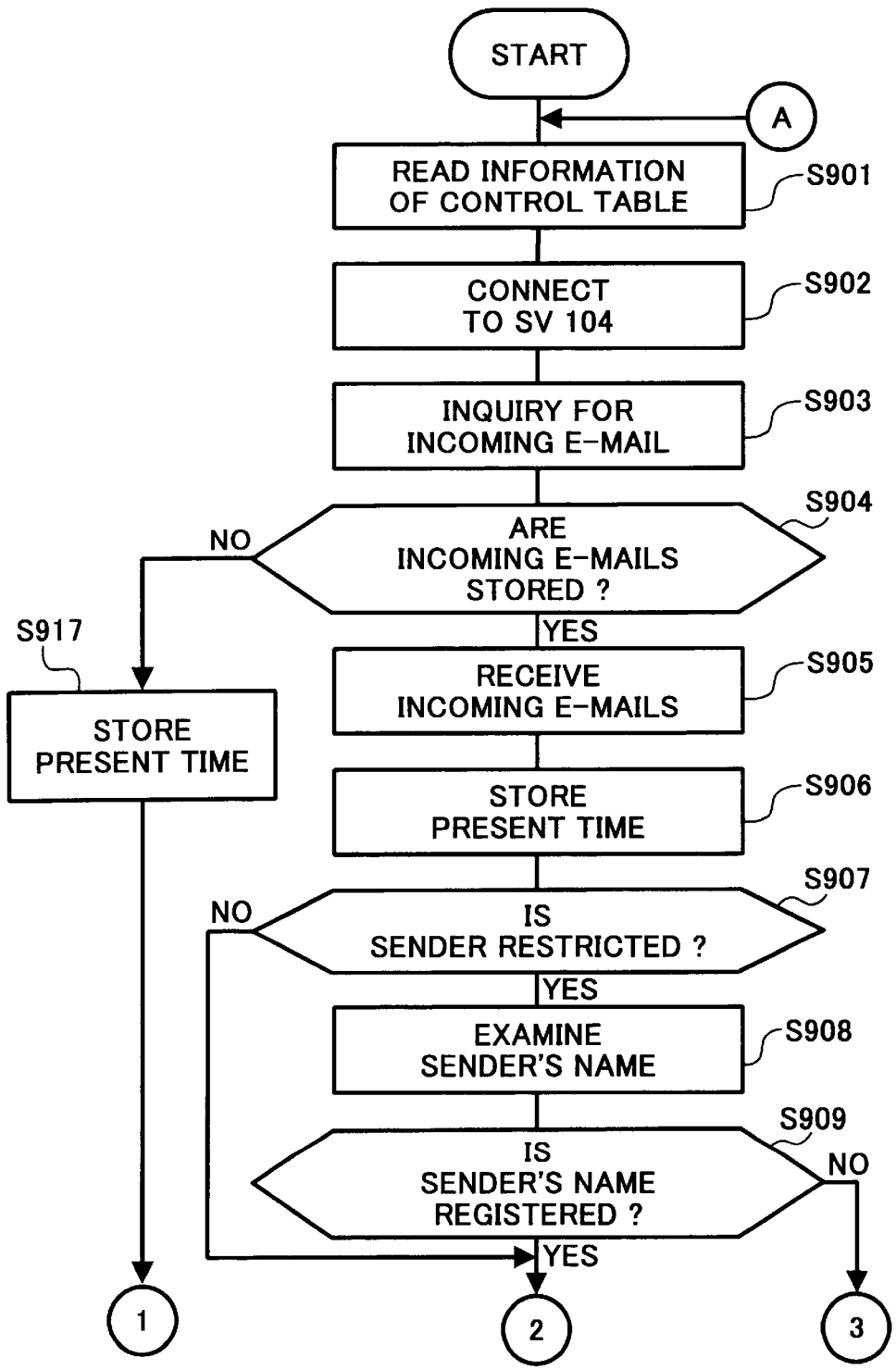

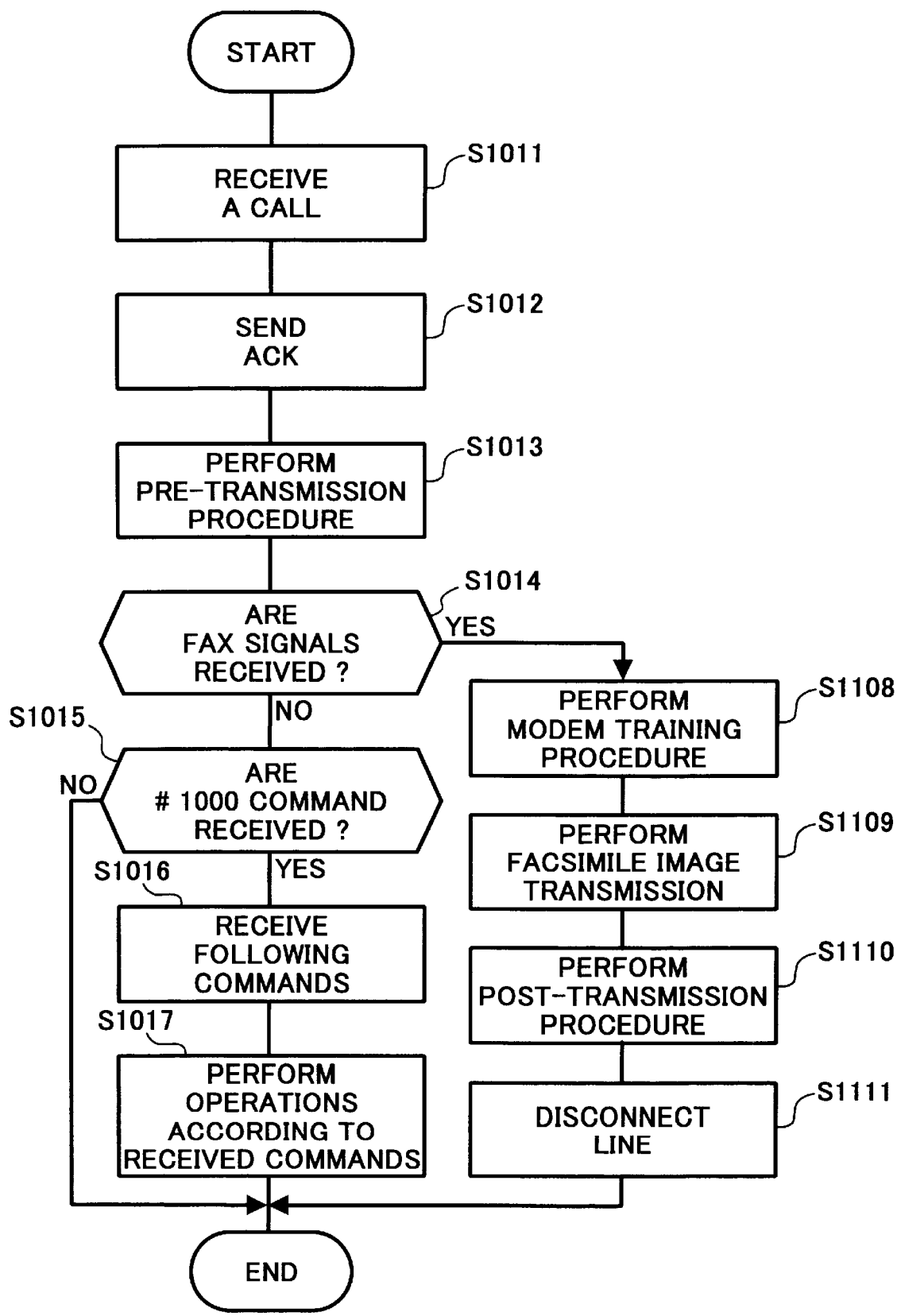

APPARATUS AND METHOD OF AUTOMATICALLY DELIVERING E-MAIL STORED IN MAIL SERVER TO ARBITRARY FACSIMILE APPARATUS

BACKGROUND

1. Field

The disclosed system and method relates to a network facsimile apparatus, and more particularly to a network facsimile apparatus which is capable of automatically delivering electronic mail which is stored in a mail server to an arbitrary facsimile apparatus.

2. Description of the Related Arts

There has been developed a so-called network facsimile machine that is capable of exchanging E-mail (electronic mail) with other data terminals via a local area network and the Internet, as well as exchanging facsimile data with other facsimile machines via a public switched telephone network (PSTN). Such a network facsimile machine is capable of transmitting image information to both users of data terminals such as PCs (personal computers) on the local area network and of facsimile machines connected to the public switched telephone network. Also, the network facsimile machine may transmit image information to data terminals connected to other local area networks when the local area network of the network facsimile machine is connected to other local area networks through the Internet.

Moreover, users can transmit image information from a facsimile machine to data terminals on a local area network via the network facsimile machine. The network facsimile machine can also relay information to other network facsimile machines across local area networks. Accordingly, users can benefit from such convenient connections between networks of the facsimile machines and the data terminals.

E-mail is a communication method conveniently used for exchanging information between the data terminals of local area networks. Since E-mails are sequentially accumulated, users may check and respond at their convenient time. Unlike telephone communications, E-mail is not a communication method that bothers users by real time communication.

Use of such E-mails can relate not only to daily communications between two users but also to simultaneous transmission of information to a number of users. E-mail can transmit an arbitrary data file in a binary data form as an attachment thereto, in addition to an ordinary text file. Accordingly, E-mail can be used as a communication tool for a so-called multimedia type information. For example, transmission of facsimile image information from a facsimile machine to a data terminal on a local area network can be achieved by attaching the facsimile image information in a binary data file to an E-mail.

Generally, a local area network is provided with a mail server for receiving and temporarily storing incoming E-mails which are addressed to users of data terminals connected to the local area network. Users can check and receive E-mails by sending an inquiry to the mail server. In an alternative system, the mail server may automatically send E-mails to the data terminal of the addressed user.

However, the above-mentioned system is useful only when the user is present at the data terminal of the local area network. It will become a problem for the user when the user is away from the data terminal for any reason and is not aware that an urgent E-mail addressed to the user has arrived at the mail server. Even when the user is aware of the urgent need of checking the incoming E-mails received at the mail server, it is not possible for the user to check for the incoming E-mails without operating the data terminal.

It is believed that there is no system available that allows users to check the incoming E-mails received at the mail server without operating the data terminal on the local area network.

SUMMARY

The present application provides a data terminal that can be coupled to a local area network and a public telephone network. In one embodiment, the data terminal includes a first communications device, a second communications device, a memory, and a delivery controller.

The first and second communications devices transmit and receive electronic mails through a local area network and facsimile image information through a public switched telephone network, respectively. The memory stores a plurality of electronic-mail delivery control information sets. Preferably, each information set is uniquely assigned to each user and includes user identifiers necessary for the user to access a mail server and to receive electronic mails for the user therefrom. The information set further includes at least one facsimile number where to deliver the electronic mails and a flag for indicating whether an electronic-mail delivery operation is required or not.

The delivery controller is used to control the first and second communications devices and the memory and allows the data terminal to perform the electronic-mail delivery operation in accordance with information of the electronic-mail delivery control information sets. In the electronic-mail delivery operation, the data terminal accesses the mail server using the user identifiers to receive electronic mails for the user when the flag indicates that the electronic-mail delivery operation is required, converts the electronic mail into facsimile image information, and transmits the facsimile image information to at least one communications terminal that has a facsimile communications function using the at least one facsimile number included in the user identifiers.

Each of the electronic-mail delivery control information sets may include a transmission time. If the transmission time is stored in each of the information sets, the data terminal can temporarily hold electronic-mails received from the mail server before being converted into facsimile image information for a time period until a time becomes equal to the transmission time, in the electronic-mail delivery operation.

Each of the electronic-mail delivery control information sets may include a priority level. If the priority level is stored in each of the information sets, the data terminal can transmits the electronic mails to the aforementioned at least one communications terminal only when the priority level of the information set for the user is below than priority information provided in the electronic mails, in the electronic-mail delivery operation.

Each of the electronic-mail delivery control information sets may include a sender's identifier. If the sender's identifier is stored in each of the information sets, the data terminal can transmits the electronic mails to the aforementioned at least one communications terminal only when the sender's identifier of the information set for the user is identical to sender's identification information provided in the electronic mails, in the electronic-mail delivery operation.

The present application also provides an electronic communications system that is capable of transmitting electronic mails from a mail server to at least one arbitrary facsimile terminal. In one embodiment, the system includes a plurality of facsimile terminals connected to a public switched telephone network and a plurality of domains connected with each other through Internet. In one embodiment, each domain includes a mail server for receiving and storing electronic mails for client terminals of the domain and a data terminal which are coupled to a local area network included in the domain. The data terminal is also coupled to the public switched telephone network.

In one embodiment, the data terminal includes a first communications device, a second communications device, a memory, and a delivery controller. The first and second communications devices transmit and receive electronic mails through the local area network and facsimile image information through the public switched telephone network, respectively. The memory stores a plurality of electronic-mail delivery control information sets. Each information set is uniquely assigned to each user and includes user identifiers necessary for the user to access the mail server and to receive electronic mails for the user therefrom. The information set also includes at least one facsimile number where to deliver the electronic mails and a flag for indicating whether an electronic-mail delivery operation is required or not.

The delivery controller controls the first and second communications devices and the memory in order to allow the data terminal to perform the electronic-mail delivery operation in accordance with information of the electronic-mail delivery control information sets. During the electronic-mail delivery operation, the data terminal accesses the mail server using the user identifiers and receives electronic mails for the user when the flag indicates that the electronic-mail delivery operation is required. Then, the data terminal converts the electronic mail into facsimile image information and transmitting the facsimile image information to at least one facsimile terminal among the plurality of the facsimile terminals using the at least one facsimile number included in the user identifiers.

Each of the electronic-mail delivery control information sets may further include a transmission time. If the transmission time is stored in the information set, the data terminal temporarily holds the electronic mails received from the mail server before converting the electronic mails into facsimile image information for a time period until a time becomes equal to the transmission time, during the electronic-mail delivery operation.

Each of the electronic-mail delivery control information sets may further include a priority level. If the priority level is stored in the information set, the data terminal transmits the electronic mails to the at least one facsimile terminal among the plurality of the facsimile terminal only when the priority level of the electronic-mail delivery control information set for the user is below than priority information provided in the electronic mails, during the electronic-mail delivery operation.

Each of the electronic-mail delivery control information sets may further include a sender's identifier. If the sender's identifier is stored in the information set, the data terminal transmits the electronic mails to the at least one facsimile terminal among the plurality of the facsimile terminal only when the sender's identifier of the electronic-mail delivery control information set for the user is identical to sender identification information provided in the electronic mails, during the electronic-mail delivery operation.

BRIEF DESCRIPTION OF THE DRAWINGS

A more complete appreciation of the present application and many of the attendant advantages thereof will be readily obtained as the same becomes better understood by reference to the following detailed description when considered in connection with the accompanying drawings, wherein:

FIGS. 3 is an example of electronic-mail delivery control information table provided to the network facsimile apparatus of FIG. 2;

FIGS. 4A and 4B are illustrations for explaining formats of electronic mails used in the electronic communications system of FIG. 1;

FIG. 9 is a modified example of the electronic-mail delivery control information table provided to the network facsimile apparatus of FIG. 2;

FIG. 16 is a flowchart explaining how the network facsimile apparatus changes information of the electronic-mail delivery control information table in accordance with the remote instructions.

DETAILED DESCRIPTION

Figure 1:
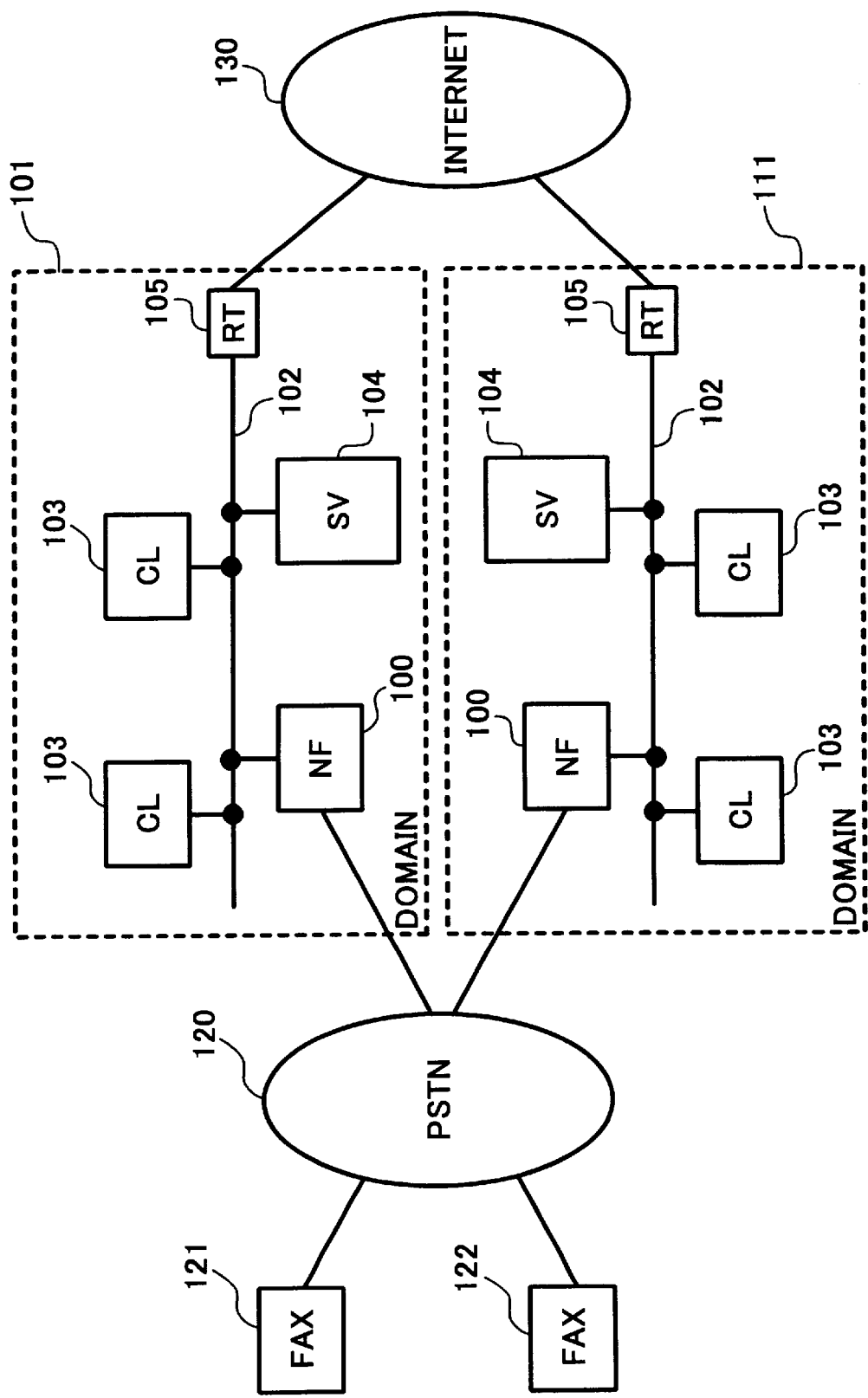
FIG. 1 is a block diagram of an electronic communications system including a network facsimile apparatus according to the present application.

In describing preferred embodiments illustrated in the drawings, specific terminology is employed for the sake of clarity. However, the invention is not intended to be limited to the specific terminology so selected and it is to be understood that each specific element includes all technical equivalents which operate in a similar manner.

Referring now to the drawings, wherein like reference numerals designate identical or corresponding parts throughout the several views, FIG. 1 illustrates an exemplary electronic communications system including a network facsimile apparatus (NF) 100. The electronic communications system of FIG. 1 includes various types of electronic communications networks such as a domain (DM) 101, a domain (DM) 111, a public switched telephone network (PSTN) 120, the Internet 130, and possibly other networks which are not specifically illustrated.

The DM 101 includes a local area network (LAN) 102 that connects various devices, including the above-mentioned network facsimile apparatus 100, a plurality of client terminals (CL) 103, a mail server (SV) 104, and a router (RT) 105 and that allows communications between the various devices. The DM 111 has a similar configuration to that of the DM 101 for the sake of simplicity. The PSTN 120 connects a plurality of communications terminals including Group 3 facsimile machines (FAX) 121 and 122 to allow communications between these terminals. The Internet 130 connects a plurality of domains (DMs), including the DMs 101 and 111, and allows communications between the domains.

In each of the DMs 101 and 111, the network facsimile apparatus 100 is connected to the LAN 102 and the PSTN 120 to function as a gateway to both networks. The RT 105 is connected to the LAN 102 and the Internet 130 to function as another gateway to these networks. Through these connections, each of the LANs 102 has a connection to the plurality of communications terminals including the FAXs 121 and 122 through the PSTN 120 and to the plurality of domains through the Internet 130.

Preferably, each of the FAXs 121 and 122 transmits and receives image information through a Group 3 facsimile communications procedure.

Each of the DMs 101 and 111 has an individual domain identification. Each of the DMs 101 and 111, the network facsimile apparatus 100, each of the CLs 103, and the SV 104 is given an individual network address, usually based on its individual address information coupled with the corresponding domain identification. A user who uses a client terminal in the DM 101 is provided with an individual user address which is usually based on the user's individual name coupled with the above-mentioned individual network address of the client terminal. Such an individual user address that is generally made of alphanumeric symbols including alphabetical characters is referred to as an electronic mail (E-mail) address. Using these network addresses and E-mail addresses, communications are carried out between terminals including the CLs 103 and the network facsimile apparatus 100 within a domain and between domains through the Internet 130.

The network facsimile apparatus 100 sends and receives electronic mail (E-mail) to and from other terminal machines through the LAN 102. The network facsimile apparatus 100 further has general facsimile functions including a Group 3 facsimile communications capability for transmitting and receiving facsimile image information to and from destination facsimile machines through the PSTN 120.

Generally, a so-called protocol suite is applied for communications between machines connected to local area networks and via the Internet. In an operation of the protocol suite, a communication protocol, such as TCP/IP (transmission control protocol/Internet protocol) and another communication protocol are used in combination for up to a transport layer of an OSI (open systems interconnection), and for the layers higher than the transport layer, respectively. For example, an SMTP (simple mail transfer protocol) is used as a higher layer protocol for communications such as E-mail.

In each of the DMs 101 and 111, the LAN 102 employs a mail server system in which an incoming E-mail is first stored in the SV 104 and then sent to a destination client terminal. More specifically, when E-mail information reaches a domain, for example DM 101, the file server 104 checks a destination mail address attached to the E-mail and if the destination mail address is for a client terminal of that domain the mail server system of the domain stores the E-mail into the SV 104. When the E-mail has a destination mail address other than one controlled by the domain, the mail server system of the domain transmits the E-mail to the Internet 130 via the RT 105, and the E-mail is sent to another domain, e.g. the DM 111, to seek the destination terminal machine, or to a host machine that has an address corresponding to the destination mail address attached to the E-mail, through a data transmission function of the Internet 130.

In the above-described server system, at a certain interval the network facsimile apparatus 100 and the CLs 103 in each domain, e.g., DMs 101 and 111, request the SV 104 to check if an incoming E-mail addressed for a user of the requesting machine is stored therein. If an E-mail addressed to the user of the requesting machine is stored in the SV 104, the mail server system transmits the E-mail to the requesting machine. Upon receiving the E-mail, the requesting machine indicates to the user that there is an incoming E-mail. In the example being described, the network facsimile apparatus 100 has an E-mail address to exchange E-mails as described above. The protocol is a POP (post office protocol), for example, to be applied for the communications from the CLs 103 and the network facsimile apparatus 100 to the SV 104 to request the incoming check as described above.

In the example being described, each of the CLs 103 has various application software programs including programs that are usually used by one or more users on an exclusive basis for exchanging various data such as E-mail with other terminals through the LAN 102 and for processing facsimile image information included in E-mail sent from the network facsimile 100.

For example, when a user sees an indication of an E-mail arrival, the user may open the E-mail to check the contents. If the contents includes binary data such as facsimile image information, the user can initiate a program that can handle the binary data in an appropriate manner so as to see the contents. Typically, to review the binary data in E-mail, the data is first transferred into a different data format such as a MIME (multi-purpose Internet mail extensions).

The above-mentioned communication protocols, such as the TCP/IP, SMTP, and POP, as well as the data format and structure of the E-mail, including the MIME, are defined in an RFC (request for comments) published by an IETF (Internet engineering task force). For example, the TCP and IP are defined in an RFC793, the SMTP in an RFC821, and the data format and structure of the E-mail in an RFC822, RFC1521, RFC1522, and RFC1468.

Figure 2:
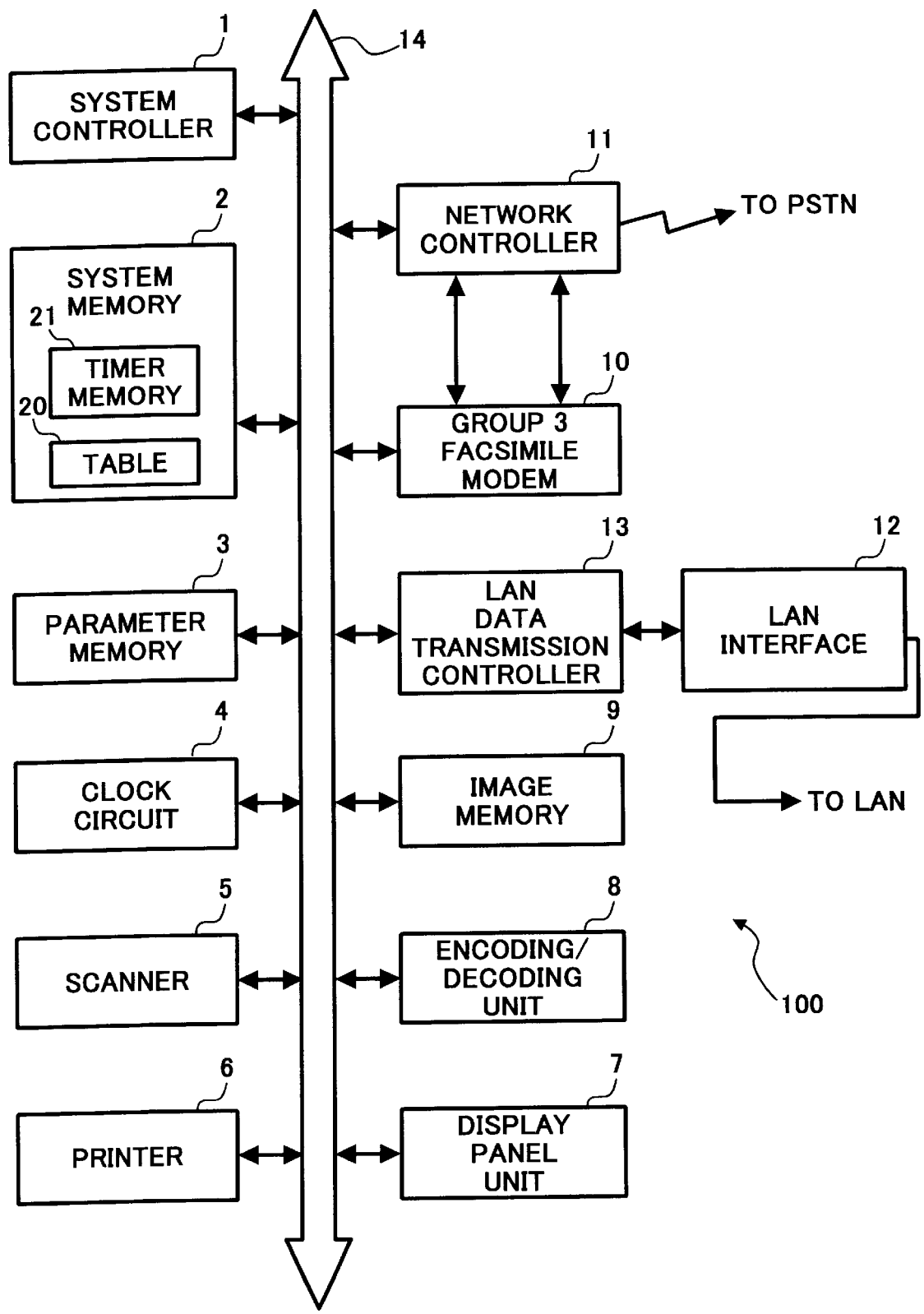
FIG. 2 is a block diagram of the network facsimile apparatus included in the electronic communications system of FIG. 1.

Next, an exemplary structure of the network facsimile apparatus 100 is explained with reference to FIG. 2. The network facsimile apparatus 100 includes a system controller 1, a system memory 2, a parameter memory 3, a clock circuit 4, a scanner 5, a printer 6, a display panel unit 7, an encoding/decoding unit 8, an image memory 9, a Group 3 facsimile modem 10, a network controller 11, a LAN (local area network) interface 12, a LAN (local area network) data transmission controller 13, and an internal bus 14.

The system controller 1 controls the operation of the network facsimile apparatus 100 including facsimile data transmission controls for transmitting and receiving image information and arbitrary data files. The system memory 2 stores control (or application) programs to be performed by the system controller 1 and various kinds of data necessary for the execution of the control programs. In addition, the system memory 2 includes an E-mail delivery information table 20, an E-mail check time memory 21, and a working memory area reserved for use of the system controller 1. The E-mail delivery information table 20 and the E-mail check time memory 21 will be explained later. The parameter memory 3 stores various kinds of parameters and information specific to the network facsimile apparatus 100. The clock circuit 4 generates information of the present time.

The scanner 5 reads an image of a document at a predetermined resolution. The printer 6 produces an image output at a predetermined resolution. The display panel unit 7 includes various kinds of operational keys and indicators interfacing between an operator and the network facsimile apparatus 100.

The encoding/decoding unit 8 encodes an input image signal to compress the image information and decodes the compressed image information back into the input image signal and the transmission data memory 9 stores data including the compressed image data and data files to be transmitted.

The Group 3 facsimile modem 10 is preferably a Group 3 facsimile modem that performs the functions of a modem for the Group 3 facsimile machine. The facsimile modem 10 includes a low-speed modem function, such as a V.21 modem, for transmitting and receiving communication protocols and a high-speed modem function, such as V.17, V.34, V.29, V.27ter modems, for mainly transmitting and receiving image information. The Group 3 facsimile modem 10 also includes a tone generating function for generating various different tones and a tone detecting function for detecting various different tones including a push-button-tone signal, for example. The network controller 11 has direct connections to the Group 3 facsimile modem 10. The network controller 11 includes an automatic transmitting and receiving function and controls the connection of the network facsimile apparatus 100 to the PSTN 120.

The LAN interface 12 is a communication interface between the LAN data transmission controller 13 and the LAN 102 located in the same domain as the network facsimile apparatus 100. The LAN data transmission controller 13 controls communications, using a predetermined protocol suite, for exchanging various kinds of data with other devices associated with the same domain as the network facsimile apparatus 100, e.g., DM 101, via the LAN 102. The controller 13 can also control communications for exchanging various kinds of data with data terminal machines associated with other domains via the Internet 130.

The internal bus 14 is connected to all of the above-described units of the network facsimile apparatus 100, except for the LAN interface 12 which has a connection to the LAN data transmission controller 13. The bus 14 provides a medium for communications between the various units of the network facsimile apparatus 100.

In this way, one of the preferred structures of the network facsimile apparatus 100 is arranged.

Next, the E-mail delivery information table 20 is explained with reference to FIG. 3. The E-mail delivery information table 20 contains information necessary for the network facsimile apparatus 100 to perform an E-mail delivery operation for delivering E-mails to destination users. For example, the table 20 includes a plurality of information columns, each of which contains various kinds of user registration information including: an ID (identification) 20a for identifying a registered user; a name 20b representing the name of the registered user; a pass word 20c representing the pass word provided to the registered user; a facsimile number 20d for indicating a registered destination facsimile terminal to which E-mails transferred from the SV 104 for the registered user are to be transferred; an interval 20e for indicating predetermined time intervals between placements of a request to the SV 104 that the SV 104 transfers E-mails for the registered user to the network facsimile apparatus 100; and an on/off flag 20f for indicating that the E-mail delivery operation is operable when the flag 20f is on and that the E-mail delivery operation is inoperable when the flag 20f is off. The above-mentioned name 20b and pass word 20c are the previously-registered information for the registered user to perform the communications with the SV 104 for the E-mail exchanges within the LAN 102.

Users may register to the E-mail delivery information table 20 on the network facsimile apparatus 100, or the CLs 103 using an appropriate application software for handling such table 20. Also, users may change the status of the on/off flag 20f, preferably, on the CLs 103 on an as needed basis. In this case, a user authentication may be needed to be performed before changing the flag 20f, through a point-to-point communications procedure using a point-to-point protocol, for example.

Next, examples of E-mails will be introduced below with reference to FIGS. 4A and 4B. E-mails including an E-mail 30 of FIG. 4A and an E-mail 31 of FIG. 4B generally contains a header and contents. As one example, the E-mail 30 which is referred to as a basic E-mail has a header that includes various information fields including a "Date" field for indicating time and date for transmission, a "Message-ID (identification)" field for indicating information for identifying a message, a "From" field for indicating a sender's name, a "To" field for indicating a receiver's name, and a "Subject" field for indicating a title of a message. Typically, the contents of the E-mail 30 is a message in English language as illustrated in FIG. 4A, for example.

One of the common requirements for E-mails is to use human-readable 7-bit codes to write contents. For this purpose, a MIME (multipurpose Internet mail extensions) format according to the RFC1521 and RFC1522 is generally used. Another example is referred to as a MIME format E-mail. The E-mail 31 illustrated in FIG. 4B is the MIME format E-mail and has contents of a message, for example, in Japanese language composed of 2-byte codes. In this case, the message in the 2-byte Japanese symbol/character codes is required to be converted into binary codes, for example, in a MIME (multi-purpose Internet mail extensions) format. When the message is converted into the MIME format, a value of a "charset", which is explained later, and a conversion of the Japanese character code set are designated in accordance with the RFC1468. For the sake of convenience, however, this example of Japanese message illustrated in FIG. 4B is left as it is as it may become non-readable when being converted into the MIME format.

The header of MIME format E-mail 31 further includes a "MIME-Version" field for indicating a version of the MIME format, a "Content-Type" field for indicating a type of contents, and a "Content-Transfer-Encoding" field for indicating an encoding method applied to a conversion of the contents.

E-mail header thus identifies property of contents of the E-mail and, accordingly, the contents of the E-mail 31 is a text composed of codes according to the character code set designated by the RFC1468.

More specifically, in the case of E-mail 31, the "MIME-Version" field indicates a value "1.0", and the "Content-Type" field indicates a "text/plain" for indicating that the contents are a text and a "charset="ISO-2022-JP"" for indicating that a character code set is defined by an ISO-2022-JP. Further, the "Content-Transfer-Encoding" field indicates a "7 bits" for indicating that the contents are composed of 7-bit codes.

Figure 5:
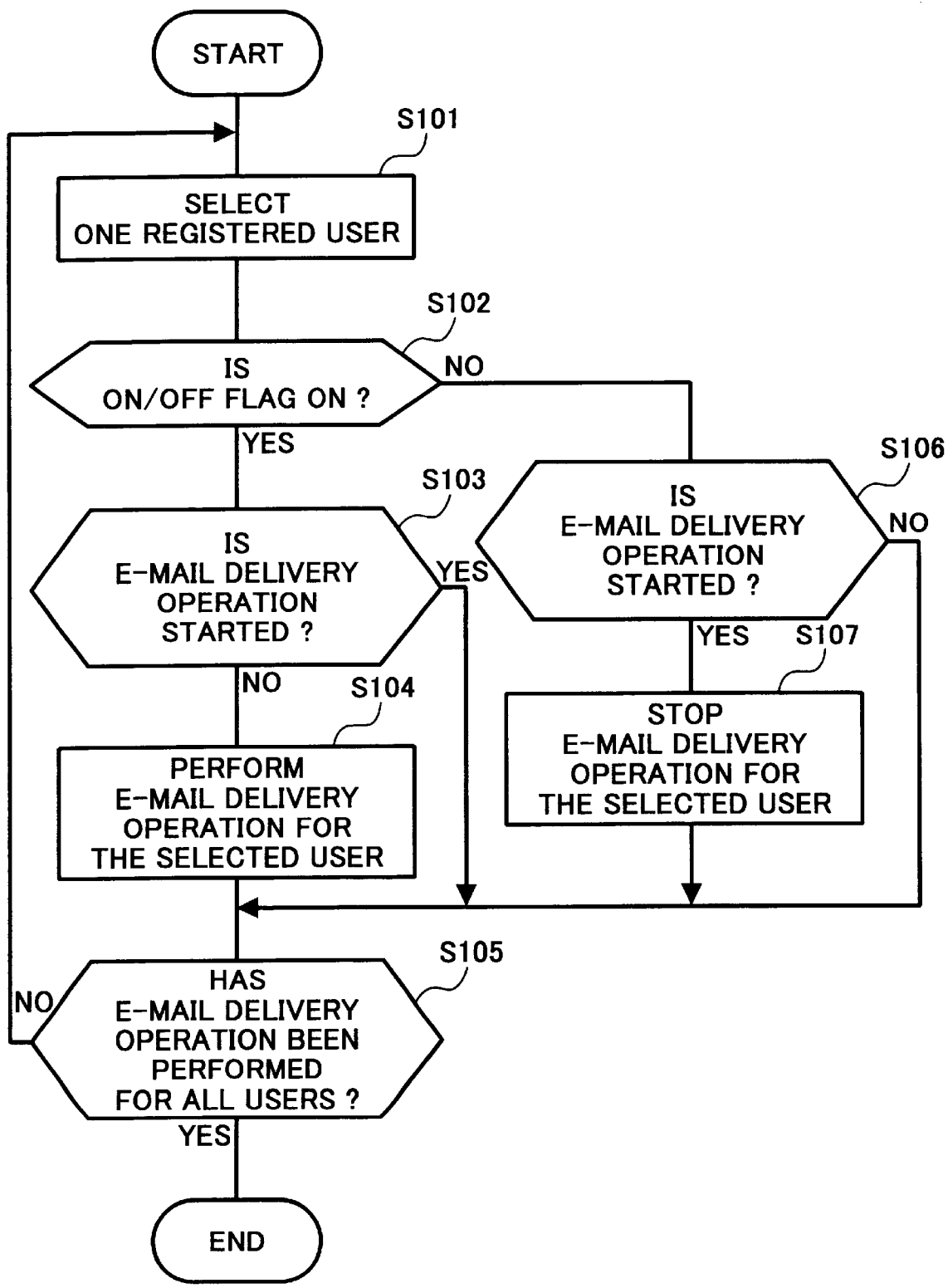
FIG. 5 is a flowchart explaining how the network facsimile apparatus of FIG. 2 starts an electronic-mail delivery operation.

Next, an exemplary procedure of starting the E-mail delivery operation operable for both E-mails 30 and 31 is explained with reference to FIG. 5. In Step S101 of the flowchart of FIG. 5, the system controller 1 of the network facsimile apparatus 100 selects one of the registered users from the E-mail delivery information table 20. Then, in Step S102 the system controller 1 checks whether the on/off flag 20f of the selected user is in a status of on. If the on/off flag 20f is in a status of on and the check result of Step S102 is YES, the system controller 1 further checks in Step S103 if the E-mail delivery operation has been started for the selected user. If the E-mail delivery operation has not been started for the selected user and the check result of Step S103 is NO, the system controller 1 starts the E-mail delivery operation for the selected user in Step S104. After the operation of Step S104, the process proceeds to Step S105 and the system controller 1 checks if all the registered users are selected. If there are registered users who are not selected yet and the check result of Step S105 is NO, the process returns to Step S101 in order to select the next user. If there are no more registered users who are not selected and the check result of Step S105 is YES, the process ends.

If the E-mail delivery operation has been started for the selected user and the check result of Step S103 is YES, the process jumps to Step S105 where a completion of user selection is checked and the process returns to Step S101 or ends depending upon the check result of Step S105 as described above.

If the on/off flag 20f is in a status of off and the check result of Step S102 is NO, the system controller 1 checks in Step S106 if the E-mail delivery operation has been started for the selected user. If the E-mail delivery operation has been started for the selected user and the check result of Step S106 is YES, the system controller 1 stops the ongoing operation of the E-mail delivery operation for the selected user and, then, the process proceeds to Step S105 and the process returns to Step S101 or ends depending upon the check result of Step S105 as described above. If the E-mail delivery operation has not been started for the selected user and the check result of Step S106 is NO, the process proceeds to Step S105 and the process returns to Step S101 or ends depending upon the check result of Step S105 as described above.

Next, an exemplary procedure of the E-mail delivery operation operable for the basic E-mail 30 is explained with reference to FIG. 6. The system controller 1 starts the E-mail delivery operation by selecting the registered users as described above. Having one registered user selected and the E-mail delivery operation started, the system controller 1 in Step S201 instructs the LAN data transmission controller 13 to connect to the SV 104, via the LAN interface 12, through a predetermined communications procedure, such as POP (post office protocol), using the user name 22 and the pass word 23 of the selected user from the E-mail delivery information table 20. In Step S202, the system controller 1 subsequently sends to the SV 104 an inquiry asking if the SV 104 holds incoming E-mails addressed to the selected user.

Then, the system controller 1 checks if the SV 104 holds an incoming E-mail for the selected user, Step S203. If the SV 104 holds such an incoming E-mail and the check result of Step S203 is YES, the system controller 1 sends a request for transmitting the incoming E-mail held for the selected user and receives it, in Step S204. At this time, the SV 104 does not delete the transmitted E-mail and maintains to hold it even after the transmission. Then, in Step S205, the system controller 1 stores the present time into the E-mail check time memory 21. The stored present time is referred to as a time when the network facsimile apparatus 100 receives the E-mail from the SV 104. Based on this time, the network facsimile apparatus 100 can determine a time to perform the next E-mail delivery operation. After setting the present time into the E-mail check time memory 21, the system controller 1 converts the contents of the received E-mail into facsimile image information, in Step S206. In this process, an TTI (transmitter terminal identification) located at the top of the facsimile image information may include information for indicating a sending terminal based on the value of the "From" field and a destination terminal based on the value of the "To" field.

Then, in Step S207, the system controller 1 starts an E-mail-in-facsimile-image delivery operation (E-mail delivery operation) in order to transmit the above-mentioned facsimile image information, converted from E-mail, to a facsimile terminal using the facsimile number registered for the selected user in the E-mail delivery information table 20. After the E-mail-in-facsimile-image delivery operation, in Step S208, the network facsimile apparatus 100 waits for the predetermined interval time specified in the interval 20e of the E-mail delivery information table 20, based on the time registered in the E-mail check time memory 21. When the interval time is up, the process returns to Step S201 to perform the next E-mail delivery operation.

If the SV 104 does not hold any incoming E-mail for the selected user and the check result of Step S203 is NO, the system controller 1 stores the present time into the E-mail check time memory 21 in Step S209. The stored present time is referred to as a time when the network facsimile apparatus 100 sends to the SV 104 an inquiry asking if the SV 104 holds the E-mails addressed to the selected user. Then, the process proceeds to Step S208, and the network facsimile apparatus 100 waits for the predetermined interval time specified in the interval 20e, based on the time registered in the E-mail check time memory 21. When the interval time is up, the process returns to Step S201 to perform the next E-mail delivery operation.

Figure 6:
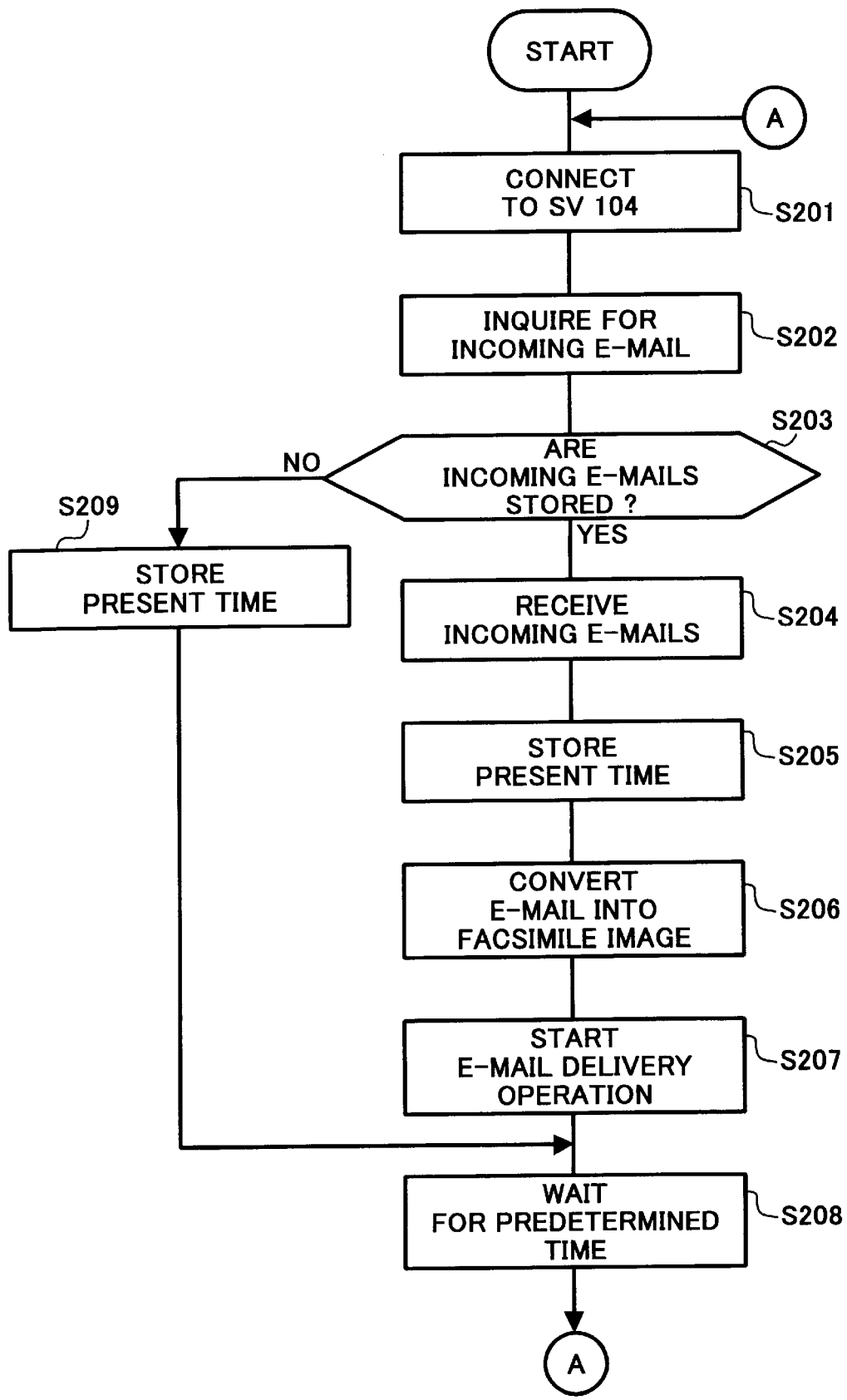
FIG. 6 is a flowchart explaining an exemplary procedure of the electronic-mail delivery operation.
Figure 7:
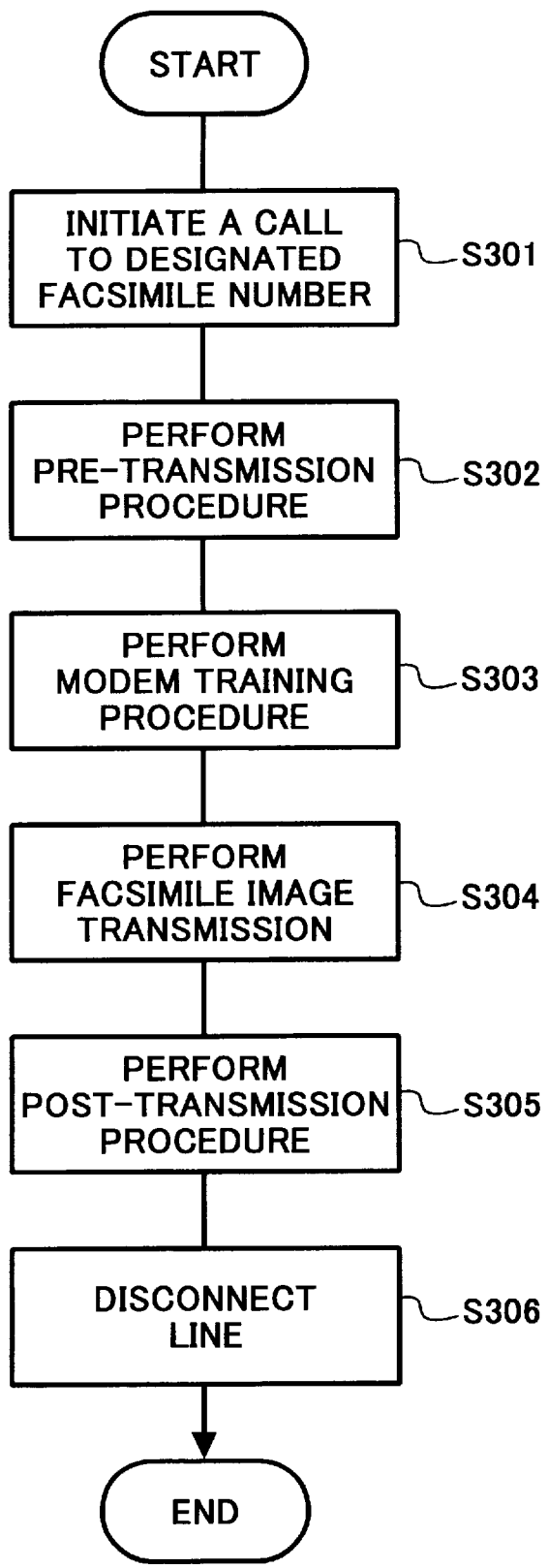
FIG. 7 is a flowchart of a detailed procedure for transmitting facsimile image information converted from electronic mails.

Next, an exemplary procedure of the E-mail-in-facsimile-image delivery operation of Step S207 of FIG. 6 is explained with reference to FIG. 7. In Step S301 of FIG. 7, the Group 3 facsimile modem 10 initiates a call to a destination facsimile terminal, designated by the facsimile number of the selected user which is registered in the facsimile number 20d of the E-mail delivery information table 20. Then, in Step S302, the Group 3 facsimile modem 10 mutually performs a predetermined pre-transmission operation with the called facsimile terminal, including a selection of transmission functions which may be used. Subsequently, the Group 3 facsimile modem 10 executes a modem training procedure at the selected modem speed and determines a real modem speed to be used. Then, in Step S304, the Group 3 facsimile modem 10 transmits the designated facsimile image file converted from the E-mail to the called facsimile terminal, in a predetermined facsimile transmission procedure.

After the E-mail-in-facsimile-image delivery operation, the Group 3 facsimile modem 10 executes a predetermined post transmission operation in Step S305 and disconnects the line in Step S306. The E-mail-in-facsimile-image delivery operation is thus executed and ended.

In the way as described above, the network facsimile apparatus 100 communicates with the SV 104 to check incoming E-mails for a user who is registered in the E-mail delivery information table 20 in which the corresponding on/off flag 20f is set to 1 (on) and receives the E-mails for the user from the SV 104. Then, the network facsimile apparatus 100 converts the E-mail information into a facsimile image form and sends the E-mail-in-facsimile-image information to a destination facsimile terminal designated by a facsimile number registered in the facsimile number 20d of the E-mail delivery information table 20. Thereby, users can see the incoming E-mails even away from the office, for example, at a private house after office hours so as to take immediate actions even in urgent cases.

Next, an exemplary procedure of the E-mail delivery operation operable for the MIME format E-mail 31 is explained with reference to FIG. 8. A MIME format E-mail has an attachment of binary-code file which is converted from the contents unconformable to the requirement that the contents of E-mail is written in human-readable 7-bit codes. Although the example being explained refers the MIME format E-mail 31, other types of E-mail may also be applied as well, including an RTF (rich text format) text E-mail created with, for example, a word processing application, a facsimile image information file E-mail sent from another network facsimile apparatus 100, and the like.

Figure 8B:
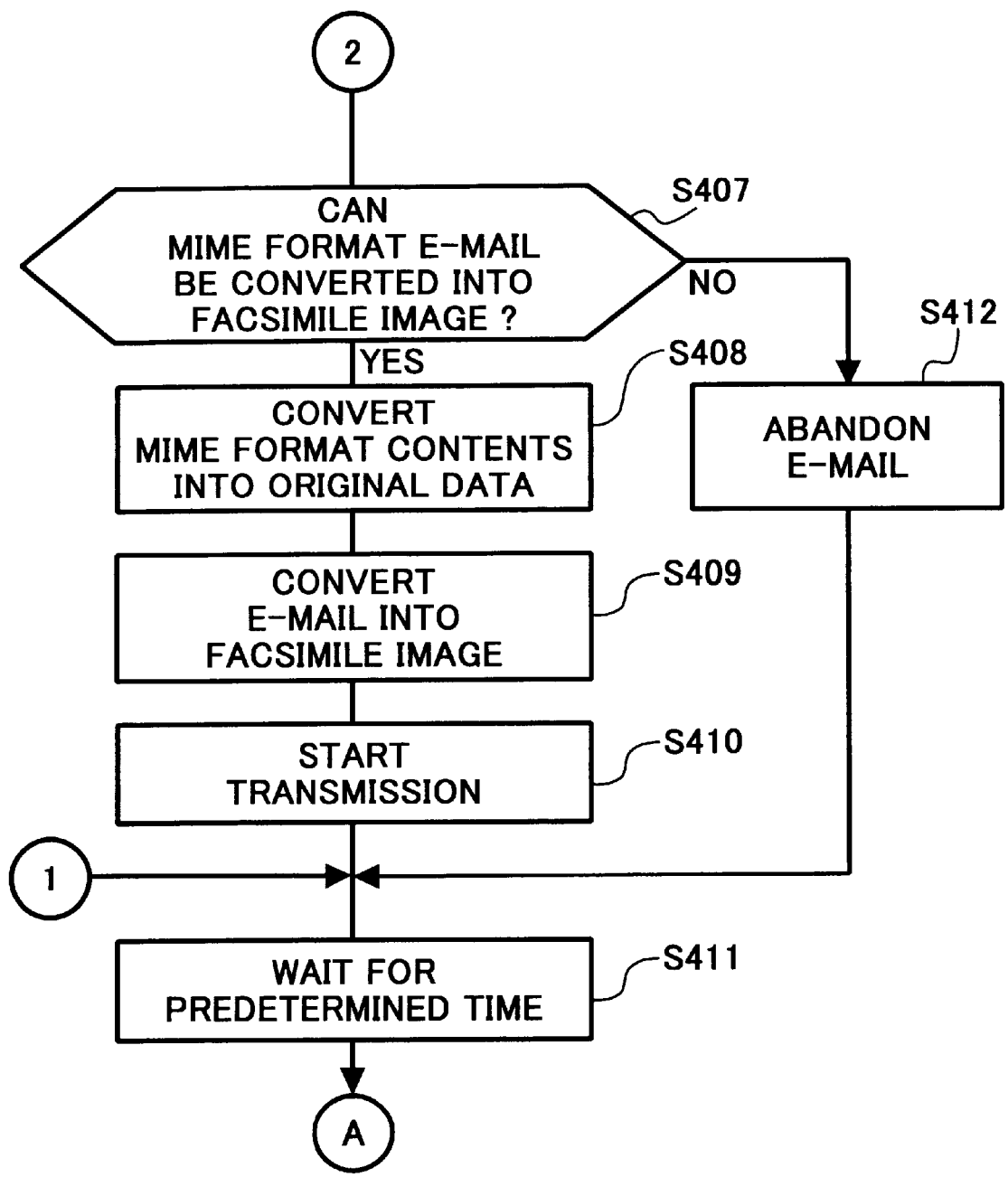
FIG. 8 is a flowchart explaining a modified procedure of the electronic-mail delivery operation.

In the flowchart of FIG. 8, it is understood that the network facsimile apparatus 100 has started the E-mail delivery operation through the procedure of FIG. 6, selecting one of the registered users. In Step S401 of FIG. 8, the system controller 1 instructs the LAN data transmission controller 13 to connect to the SV 104, via the LAN interface 12, through a predetermined communications procedure, such as POP (post office protocol), using the user name 22 and the pass word 23 of the user from the E-mail delivery information table 20. In Step S402, the system controller 1 subsequently sends to the SV 104 an inquiry for incoming E-mails addressed to the user.

In Step S403, the system controller 1 determines the result of inquiry in Step S402. If the SV 104 holds such an incoming E-mail and the determination result of Step S403 is YES, the system controller 1 sends a request for transmitting the incoming E-mail held for the selected user and receives such E-mail, in Step S404. At this time, the SV 104 does not delete the transmitted E-mail and maintains to hold it even after the transmission. Then, in Step S405, the system controller 1 stores the present time into the E-mail check time memory 21. The stored present time is referred to as a time when the network facsimile apparatus 100 receives the E-mail from the SV 104. Based on this time, it will become possible for the network facsimile apparatus 100 to determine the next time to perform the E-mail delivery operation.

After setting the present time into the E-mail check time memory 21, the system controller 1 examines the contents of the received E-mail in Step S406. More specifically, when the received E-mail is in the MIME format, for example, the system controller 1 examines if the information of the file attached to the contents of the E-mail can be converted into facsimile image information by checking a file name extension of the received MIME-format E-mail. Then, the examination result is determined in Step S407.

If the information of the attached file can be converted into facsimile image information and the determination result of Step S407 is YES, the process proceeds to Step S408 where the information of the attached file is converted back into the original contents and, in Step S409, the whole E-mail information including the original contents is then implemented into information in corresponding facsimile image information. In this process, an TTI (transmitter terminal identification) located at the top of the facsimile image information may include information for indicating a sending terminal based on the value of the "From" field and a destination terminal based on the value of the "To" field.

Then, in Step S410, the system controller 1 starts the E-mail-in-facsimile-image delivery operation, which is described above with reference to FIG. 7, so as to transmit the above-mentioned facsimile image information, converted from E-mail, to a facsimile terminal designated by the facsimile number 20d of the E-mail delivery information table 20. After the E-mail-in-facsimile-image delivery operation, in Step S411, the network facsimile apparatus 100 waits for the predetermined interval time specified in the interval 20e of the E-mail delivery information table 20, based on the time registered in the E-mail check time memory 21. When the interval time is up, the process returns to Step S401 to perform the next E-mail delivery operation.

If the information of the attached file can not be converted into facsimile image information and the determination result of Step S407 is NO, the process proceeds to Step S412 where the system controller 1 abandons the received E-mail. Then, in Step S411, the network facsimile apparatus 100 waits for the predetermined interval time specified in the interval 20e, based on the time registered in the E-mail check time memory 21. When the interval time is up, the process returns to Step S401 to perform the next E-mail delivery operation.

If the SV 104 does not hold any incoming E-mail for the user and the determination result of Step S403 is NO, the system controller 1 stores the present time into the E-mail check time memory 21 in Step S413. The stored present time is referred to as a time when the network facsimile apparatus 100 sends to the SV 104 an inquiry asking if the SV 104 holds the E-mails addressed to the selected user. Then, the process proceeds to Step S411, and the network facsimile apparatus 100 waits for the predetermined interval time specified in the interval 20e, based on the time registered in the E-mail check time memory 21. When the interval time is up, the process returns to Step S401 to perform the next E-mail delivery operation.

In this way, when an incoming E-mail includes a binary data file the network facsimile apparatus 100 converts also the binary data file into facsimile image information and sends the facsimile image information to a facsimile terminal designated by the facsimile number 20d of the E-mail delivery information table 20.

Next, an example of a modified E-mail delivery information table is explained with reference to FIG. 9. As illustrated in FIG. 9, this example is referred to as an E-mail delivery information table 120 modified from the E-mail delivery information table 20 and contains various kinds of information labeled with reference numerals 20a–20f which are similar to those contained in the previously described example of the E-mail delivery information table 20 shown in FIG. 3, and further contains the following kinds of information. The information includes a mail server name 120g, a transmission time 120h, a priority level 120i, and a sender's mail address 120j.

The mail server name 120g represents a mail server at which the user is registered as a user. The transmission time 120*h* represents a time to transmit facsimile image information to a destination facsimile terminal. The priority level 120*i* represents one of priority levels for restricting the E-mail transmission. The sender's mail address 120*j* represents at least one sender's mail address for the purpose of restricting senders.

In the sender's mail address 120*j*, one or more sender's mail addresses can be registered either in a full mail address form or only with a domain name having no user name. An N/A (not available) mark in the sender's mail address 120*j* represents a case in which no sender's mail address is registered.

Next, a first exemplary procedure of the E-mail delivery operation by the network facsimile apparatus 100 having the E-mail delivery information table 120 instead of the E-mail delivery information table 20 is explained with reference to FIG. 10. This procedure is to allow the network facsimile apparatus 100 to access a designated mail server in order to search incoming E-mails addressed to the registered users.

Figure 10B:
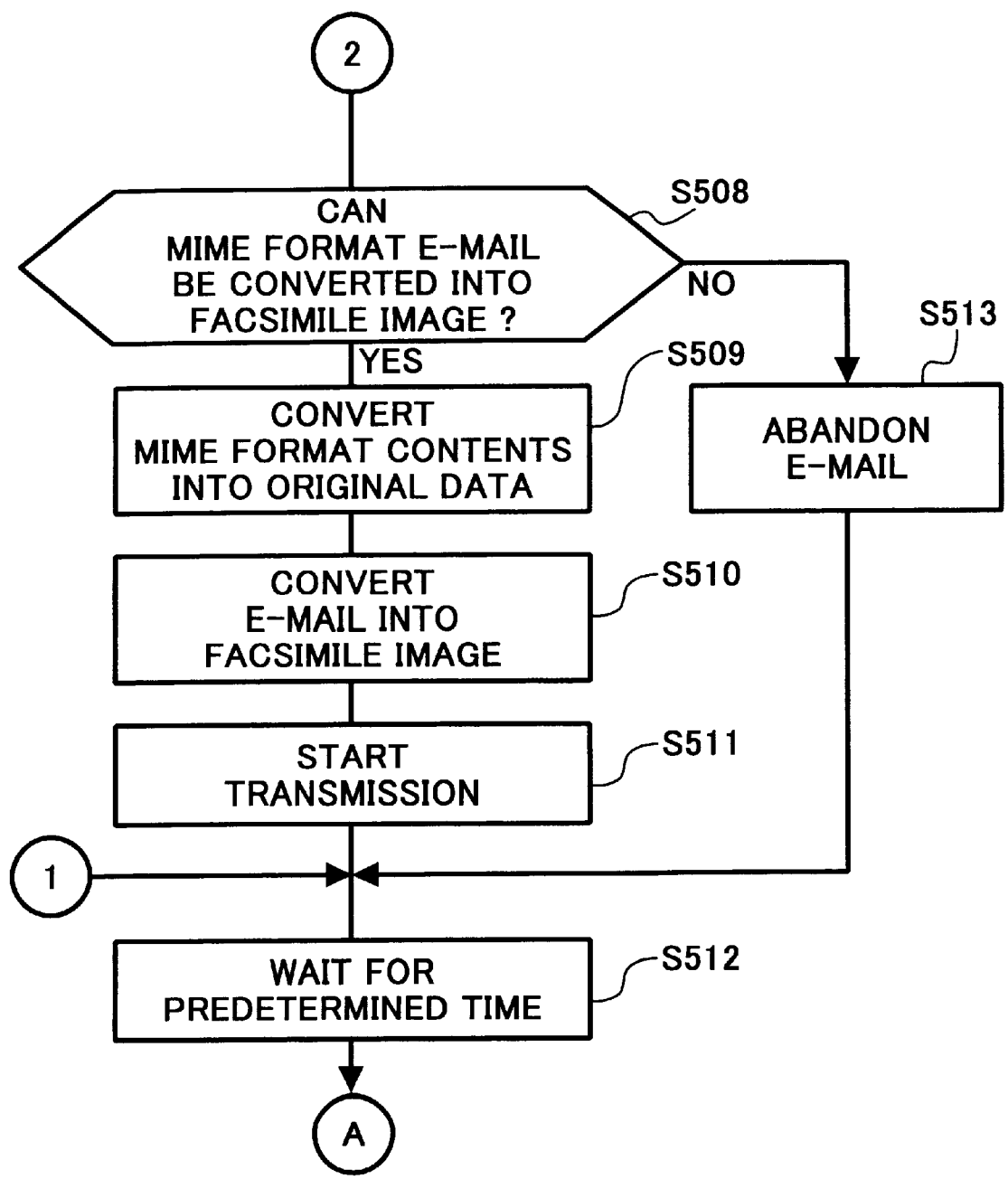
FIG. 10 is a flowchart explaining an exemplary procedure of the electronic-mail delivery operation using the modified information table of FIG. 9.

In the flowchart of FIG. 10, it is understood that the network facsimile apparatus 100 has started the E-mail delivery operation through the procedure of FIG. 6, selecting one of the registered users. In Step S501 of FIG. 10, the system controller 1 obtains the various information including the sender's mail address 120*j* for one of the registered users from the E-mail delivery information table 120. Then, in Step S502, the system controller 1 instructs the LAN data transmission controller 13 to connect to the SV 104, via the LAN interface 12, through a predetermined communications procedure, e.g. POP (post office protocol) procedure, using the user name 22 and the pass word 23 of the user from the E-mail delivery information table 120. In Step S503, the system controller 1 subsequently sends to the SV 104 an inquiry for incoming E-mails addressed to the user.

In Step S504, the system controller 1 determines the result of inquiry of Step S503. If the SV 104 holds such an incoming E-mail and the determination result of Step S504 is YES, the system controller 1 sends a request for transmitting the incoming E-mail held for the selected user and receives them, in Step S505. At this time, the SV 104 does not delete the transmitted E-mail and maintains to hold it even after the transmission. Then, in Step S506, the system controller 1 stores the present time into the E-mail check time memory 21. The stored present time is referred to as a time when the network facsimile apparatus 100 receives the E-mail from the SV 104. Based on this time, the network facsimile apparatus 100 can determine a time to perform the next E-mail delivery operation.

After setting the present time into the E-mail check time memory 21, the system controller 1 examines the contents of the received E-mail in Step S507. More specifically, when the received E-mail is, MIME format E-mail, for example, the system controller 1 examines if the information of the file attached to the contents of the E-mail can be converted into facsimile image information by checking a file name extension of the received MIME format E-mail. Then, the examination result is determined in Step S508.

If the information of the attached file can be converted into facsimile image information and the determination result of Step S508 is YES, the process proceeds to Step S509 where the information of the attached file is converted back into the original contents and, in Step S510, the whole E-mail information including the original contents is then implemented into information in corresponding facsimile image information. In this process, an TTI (transmitter terminal identification) located at the top of the facsimile image information may include information for indicating a sending terminal based on the value of the "From" field and a destination terminal based on the value of the "To" field.

In Step S511, the system controller 1 starts the E-mail-in-facsimile-image delivery operation, which is described above with reference to FIG. 7, so as to transmit the above-mentioned facsimile image information, converted from the E-mail, to a facsimile terminal designated by the facsimile number 20*d* of the E-mail delivery information table 120. After the E-mail-in-facsimile-image delivery operation, in Step S512, the network facsimile apparatus 100 waits for the predetermined interval time specified in the interval 20*e* of the E-mail delivery information table 120, based on the time registered in the E-mail check time memory 21. When the interval time is up, the process returns to Step S501 to perform the next E-mail delivery operation.

If the information of the attached file can not be converted into facsimile image information and the determination result of Step S508 is NO, the process proceeds to Step S513 where the system controller 1 abandons the received E-mail. Then, in Step S512, the network facsimile apparatus 100 waits for the predetermined interval time specified in the interval 20*e*, based on the time registered in the E-mail check time memory 21. When the interval time is up, the process returns to Step S501 to perform the next E-mail delivery operation.

If the SV 104 does not hold any incoming E-mail for the selected user and the determination result of Step S504 is NO, the system controller 1 stores the present time into the E-mail check time memory 21 in Step S514. The stored present time is referred to as a time when the network facsimile apparatus 100 sends to the SV 104 an inquiry asking if the SV 104 holds the E-mails addressed to the selected user. Then, the process proceeds to Step S512, and the network facsimile apparatus 100 waits for the predetermined interval time specified in the interval 20*e*, based on the time registered in the E-mail check time memory 21. When the interval time is up, the process returns to Step S501 to perform the next E-mail delivery operation.

In this way, the network facsimile apparatus 100 is capable of accessing an arbitrary mail server according to the information of the E-mail delivery information table so as to receive E-mails for the registered user and to transfer these E-mails to a facsimile terminal designated in the E-mail delivery information table.

Next, a second exemplary procedure of the E-mail delivery operation by the network facsimile apparatus 100 having the E-mail delivery information table 120 instead of the E-mail delivery information table 20 is explained with reference to FIGS. 11 and 12. The second exemplary procedure is to deliver E-mails in the facsimile image form after a designated time.

Figure 11B:
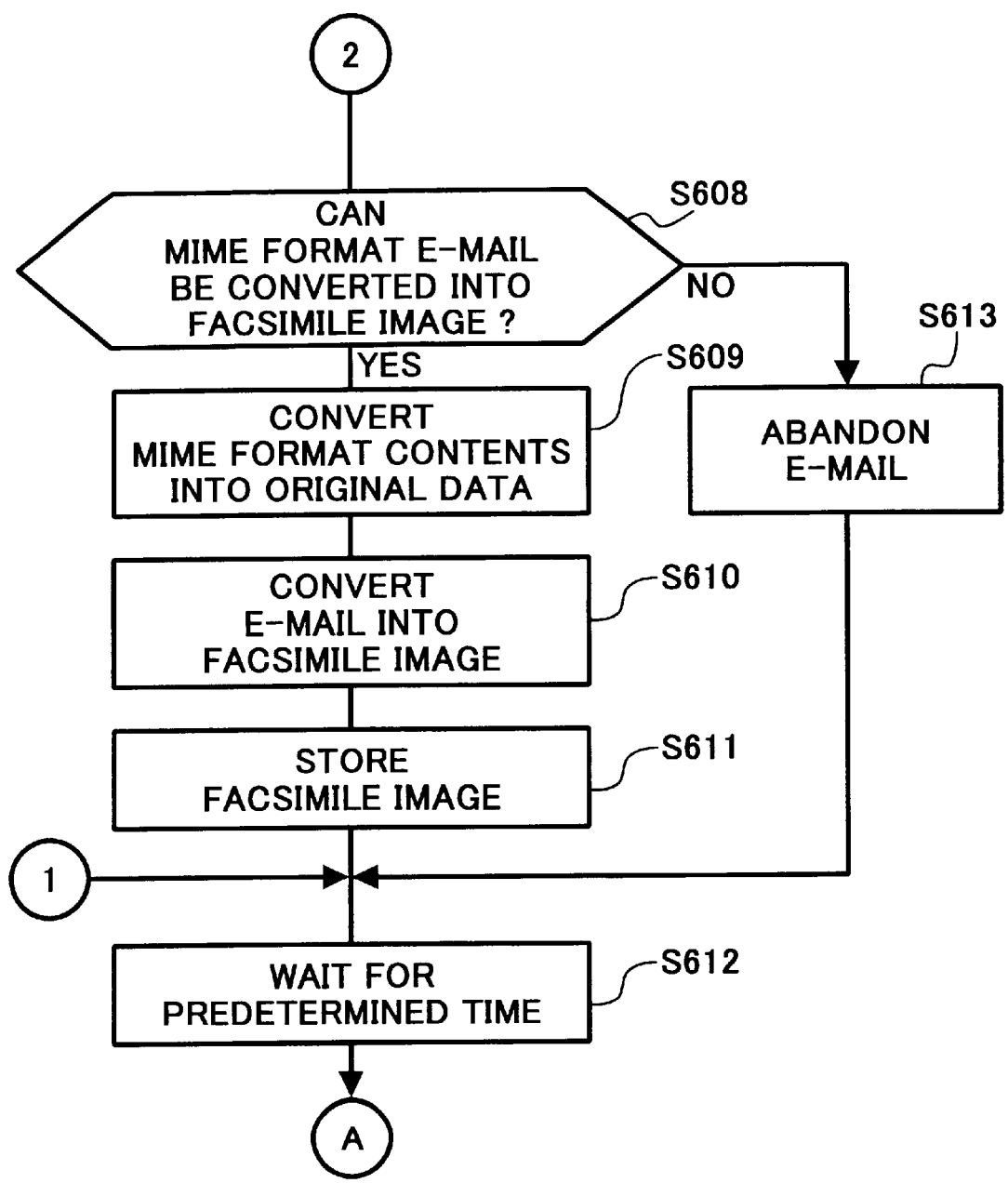
FIG. 11 is a flowchart explaining another exemplary procedure of the electronic-mail delivery operation using a transmission time of the modified information table of FIG. 9.

In the flowchart of FIG. 11, it is understood that the network facsimile apparatus 100 has started the E-mail delivery operation through the procedure of FIG. 6, selecting one of the registered users. In Step S601 of FIG. 11, the system controller 1 obtains the various information including the sender's mail address 120*j* for one of the registered users from the E-mail delivery information table 120. Then, in Step S602, the system controller 1 instructs the LAN data transmission controller 13 to connect to the SV 104, via the LAN interface 12, through a predetermined communications procedure, e.g. POP (post office protocol) procedure, using the user name 22 and the pass word 23 of the user from the E-mail delivery information table 120. In Step S603, the system controller 1 subsequently sends to the SV 104 an inquiry for incoming E-mails addressed to the user.

In Step S604, the system controller 1 determines the result of inquiry of Step S603. If the SV 104 holds such an incoming E-mail and the determination result of Step S604 is YES, the system controller 1 sends a request for transmitting the incoming E-mail held for the selected user and receives them, in Step S605. At this time, the SV 104 does not delete the transmitted E-mail and maintains to hold it even after the transmission. Then, in Step S606, the system controller 1 stores the present time into the E-mail check time memory 21. The stored present time is referred to as a time when the network facsimile apparatus 100 receives the E-mail from the SV 104. Based on this time, the network facsimile apparatus 100 can determine a time to perform the next E-mail delivery operation.

After setting the present time into the E-mail check time memory 21, the system controller 1 examines the contents of the received E-mail in Step S607. More specifically, when the received E-mail is MIME format E-mail, for example, the system controller 1 examines if the information of the file attached to the contents of the E-mail can be converted into facsimile image information. The examination can be performed by checking a file name extension of the received MIME format E-mail. Then, the examination result is determined in Step S608.

If the information of the attached file can be converted into facsimile image information and the determination result of Step S608 is YES, the process proceeds to Step S609 where the information of the attached file is converted back into the original contents and, in Step S610, the whole E-mail information including the original contents is then implemented into information in corresponding facsimile image information. In this process, an TTI (transmitter terminal identification) located at the top of the facsimile image information may include information for indicating a sending terminal based on the value of the "From" field and a destination terminal based on the value of the "To" field.

In Step S611, the system controller 1 makes the above-mentioned facsimile image information associated with the user ID 20a and stores it into the image memory 9. Then, in Step S612, the network facsimile apparatus 100 waits for the predetermined interval time specified in the interval 20e of the E-mail delivery information table 120, based on the time registered in the E-mail check time memory 21. When the interval time is up, the process returns to Step S601 to perform the next E-mail delivery operation.

If the information of the attached file can not be converted into facsimile image information and the determination result of Step S608 is NO, the process proceeds to Step S613 where the system controller 1 abandons the received E-mail. Then, in Step S612, the network facsimile apparatus 100 waits for the predetermined interval time specified in the interval 20e, based on the time registered in the E-mail check time memory 21. When the interval time is up, the process returns to Step S601 to perform the next E-mail delivery operation.

If the SV 104 does not hold any incoming E-mail for the selected user and the determination result of Step S604 is NO, the system controller 1 stores the present time into the E-mail check time memory 21 in Step S614. The stored present time is referred to as a time when the network facsimile apparatus 100 sends to the SV 104 an inquiry if the SV 104 holds the E-mails addressed to the selected user. Then, the process proceeds to Step S612, and the network facsimile apparatus 100 waits for the predetermined interval time specified in the interval 20e, based on the time registered in the E-mail check time memory 21. When the interval time is up, the process returns to Step S601 to perform the next E-mail delivery operation.

Figure 12:
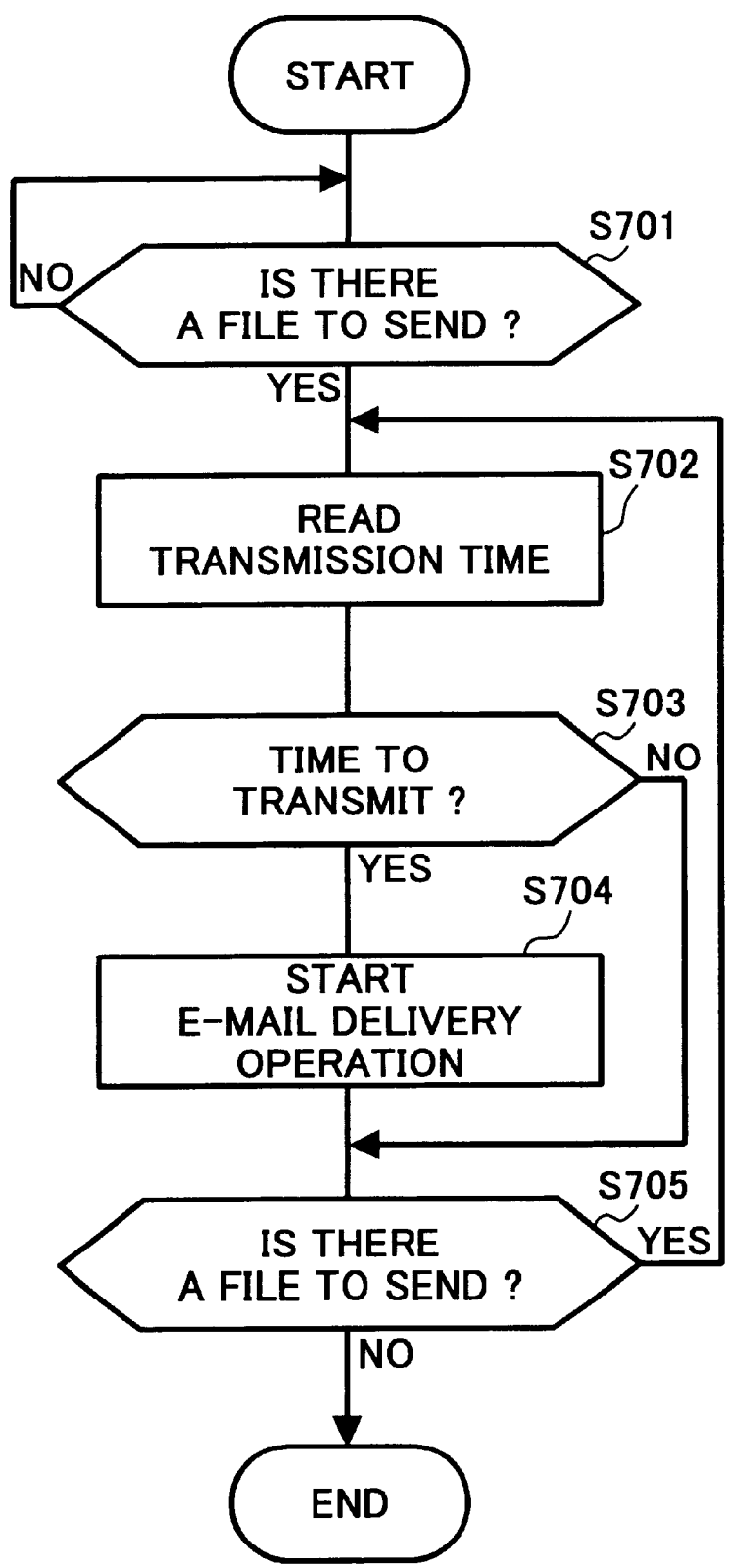
FIG. 12 is a flowchart explaining a time control procedure in the electronic-mail delivery operation of FIG. 9.

The network facsimile apparatus 100 thus stores the facsimile image information in the image memory 9 thereof and then transfers it to the designated facsimile terminal along the procedure of FIG. 12. In Step S701 of FIG. 12, the system controller 1 checks if E-mail-in-facsimile-image files are stored in the image memory 9. If the image memory 9 stores an E-mail-in-facsimile-image file and the check result of Step S701 is YES, the system controller 1 reads a value of the registered transmission time 120h and other E-mail delivery information for the user ID associated with the stored E-mail-in-facsimile-image file, in Step S702. Subsequently, in Step S703, the system controller 1 compares the value of the registered transmission time 120h to the present time indicated by the clock circuit 4 so as to check if the registered transmission time passes the present time.

If the registered transmission time passes the present time and the check result of Step S703 is YES, the process proceeds to Step S704 and the system controller 1 performs the E-mail-in-facsimile-image delivery operation performed in Step S207 of FIG. 6, under the conditions that the E-mail-in-facsimile-image file is selected and the facsimile number of the E-mail delivery information is designated. Then, in Step S705, the system controller 1 checks if the image memory 9 stores E-mail-in-facsimile-image files. If the image memory 9 stores no further E-mail-in-facsimile-image file and the check result of Step S705 is NO, the process ends.

If the image memory 9 stores an E-mail-in-facsimile-image file and the check result of Step S701 is NO, the process returns to Step S701 in order to repeat the check process.

IF the registered transmission time does not pass the present time and the check result of Step S703 is NO, the process proceeds to Step S705 and the system controller 1 checks if the image memory 9 stores E-mail-in-facsimile-image files. If the image memory 9 stores no further E-mail-in-facsimile-image file and the check result of Step S705 is NO, the process ends.

If the image memory 9 stores an E-mail-in-facsimile-image file and the check result of Step S705 is YES, the process proceeds to Step S702 and the system controller 1 reads a value of the registered transmission time 120h and other E-mail delivery information for the user ID associated with the stored E-mail-in-facsimile-image file so as to perform the next E-mail-in-facsimile-image file transmission process after a designated time according to the E-mail delivery information.

In this way, the network facsimile apparatus 100 is capable of delivering an E-mail represented in a facsimile image form to a designated facsimile terminal after a designated time.

Next, a third exemplary procedure of the E-mail delivery operation by the network facsimile apparatus 100 having the E-mail delivery information table 120 instead of the E-mail delivery information table 20 is explained with reference to FIG. 13. The third exemplary procedure is to restrict delivery of E-mails according to the priority information placed in the header of received E-mails.

Figure 13A:
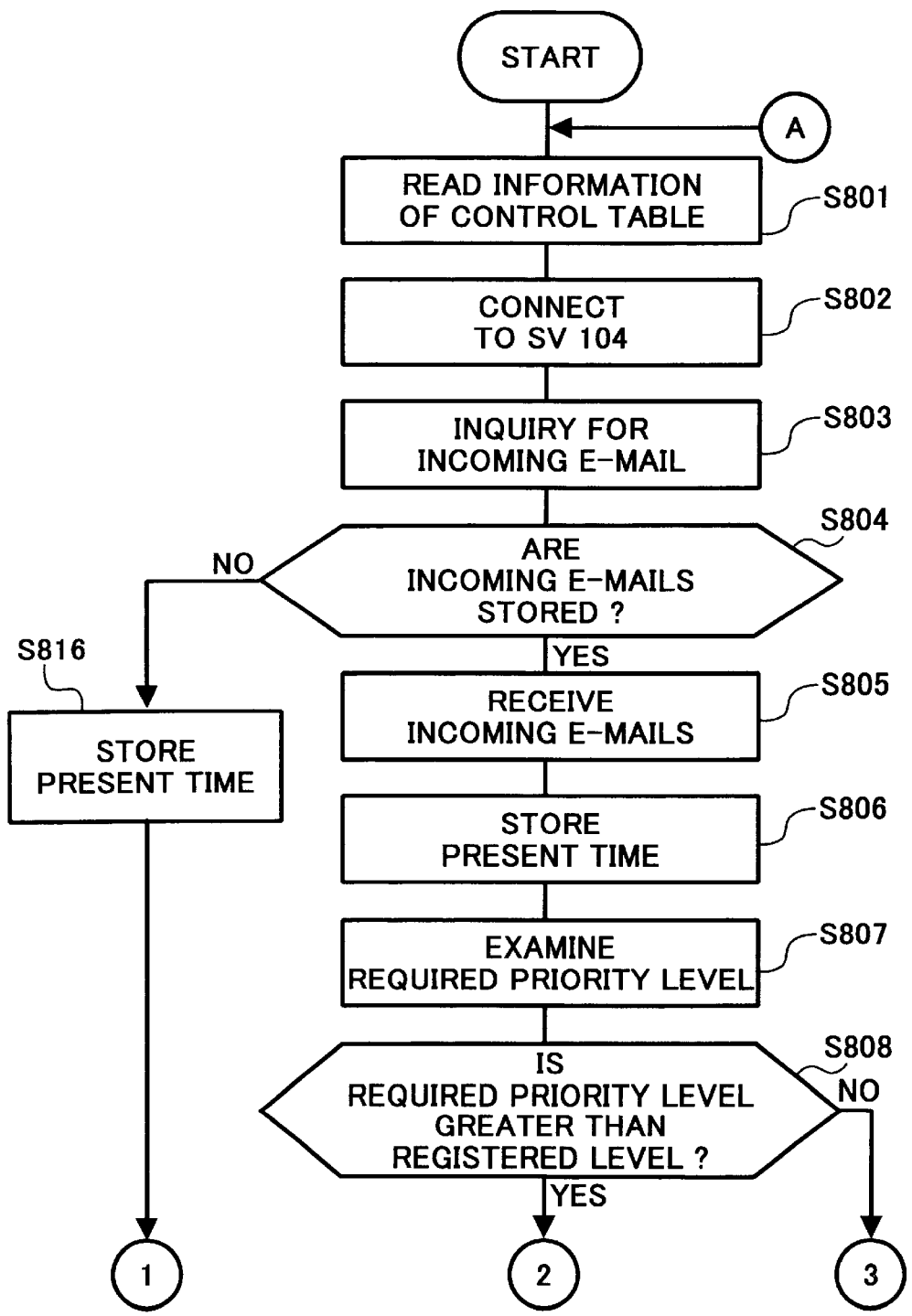
FIG. 13 is a flowchart explaining another exemplary procedure of the electronic-mail delivery operation using a priority level of the modified information table of FIG. 9.
Figure 13B:
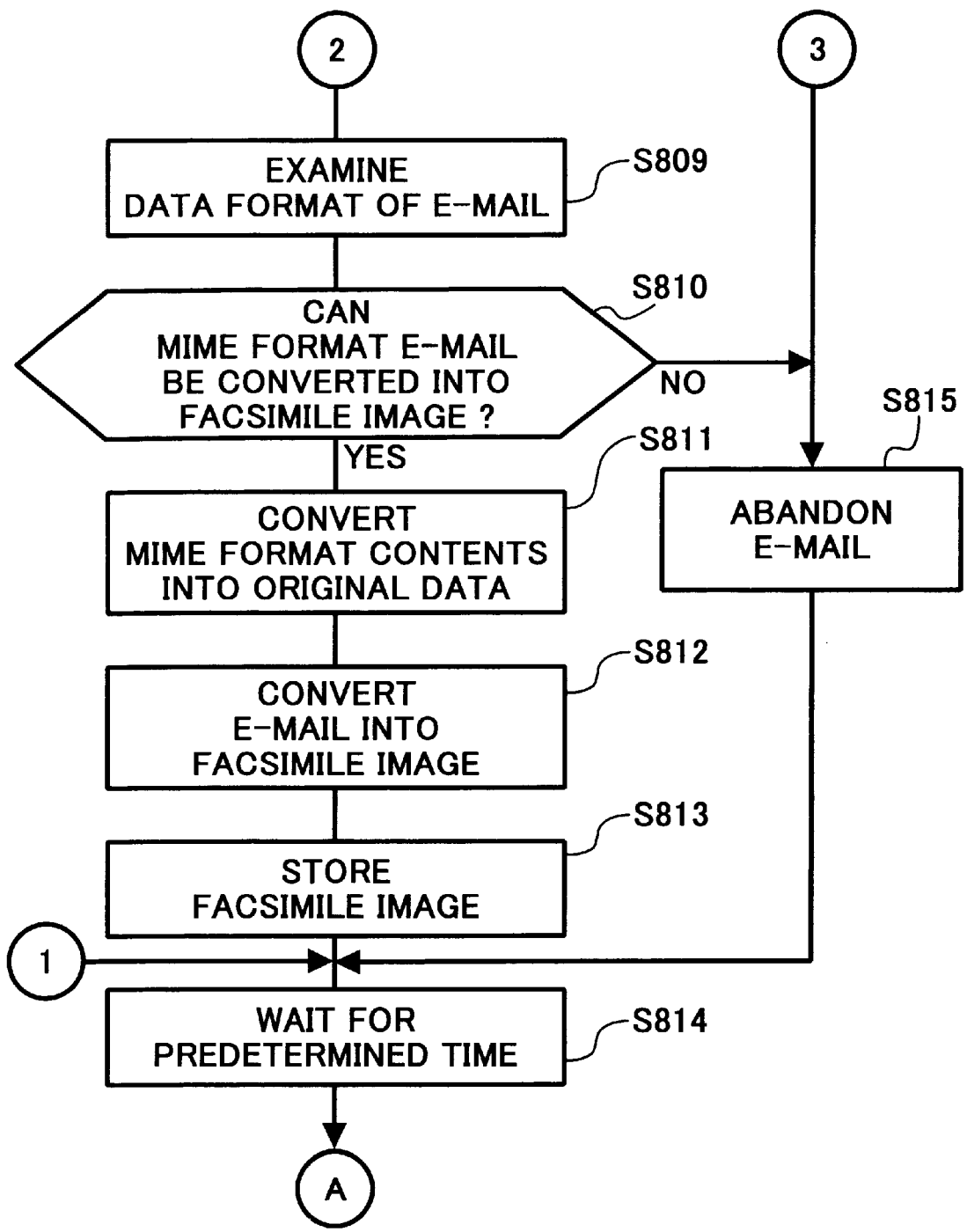

In the flowchart of FIG. 13, it is understood that the network facsimile apparatus 100 has started the E-mail delivery operation through the procedure of FIG. 6, selecting one of the registered users. In Step S801 of FIG. 13, the system controller 1 obtains the various information including the sender's mail address 120*j* for one of the registered users from the E-mail delivery information table 120. Then, in Step S802, the system controller 1 instructs the LAN data transmission controller 13 to connect to the SV 104, via the LAN interface 12, through a predetermined communications procedure, e.g. POP (post office protocol) procedure, using the user name 22 and the pass word 23 of the user from the E-mail delivery information table 120. In Step S803, the system controller 1 subsequently sends to the SV 104 an inquiry for incoming E-mails addressed to the user.

In Step S804, the system controller 1 determines the result of inquiry of Step S803. If the SV 104 holds such an incoming E-mail and the determination result of Step S804 is YES, the system controller 1 sends a request for transmitting the incoming E-mail held for the selected user and receives them, in Step S805. At this time, the SV 104 does not delete the transmitted E-mail and maintains to hold it even after the transmission. Then, in Step S806, the system controller 1 stores the present time into the E-mail check time memory 21. The stored present time is referred to as a time when the network facsimile apparatus 100 receives the E-mail from the SV 104. Based on this time, the network facsimile apparatus 100 can determine a time to perform the next E-mail delivery operation.

After setting the present time into the E-mail check time memory 21, the system controller 1 examines the contents of the received E-mail in Step S807. More specifically, the system controller 1 examines if a value of a priority field or of a X-priority field included in the header of the received E-mail is greater than the value of the priority level 120*i* of the E-mail delivery control information table 120. Then, the examination result is determined in Step S808.

If the value of priority field or of X-priority field is greater than the value of the priority level 120*i* and the determination result of Step S808 is YES, the process proceeds to Step S809 and the system controller 1 examines the contents of the received E-mail. More specifically, when the received E-mail is the MIME format E-mail, for example, the system controller 1 examines if the information of the file attached to the contents of the E-mail can be converted into facsimile image information. The examination can be performed by checking a file name extension of the received MIME format E-mail. Then, the examination result is determined in Step S810.

If the information of the attached file can be converted into facsimile image information and the determination result of Step S810 is YES, the process proceeds to Step S811 where the information of the attached file is converted back into the original contents and, in Step S812, the whole E-mail information including the original contents is then implemented into information in corresponding facsimile image information. In this process, an TTI (transmitter terminal identification) located at the top of the facsimile image information may include information for indicating a sending terminal based on the value of the "From" field and a destination terminal based on the value of the "To" field.

In Step S813, the system controller 1 starts the E-mail-in-facsimile-image delivery operation, which is described above with reference to FIG. 7, so as to transmit the above-mentioned facsimile image information, converted from the E-mail, to a facsimile terminal designated by the facsimile number 20*d* of the E-mail delivery information table 120. Then, in Step S814, the network facsimile apparatus 100 waits for the predetermined interval time specified in the interval 20*e* of the E-mail delivery information table 120, based on the time registered in the E-mail check time memory 21. When the interval time is up, the process returns to Step S801 to perform the next E-mail delivery operation.

If the value of priority field or of X-priority field is not greater than the value of the priority level 120*i* and the determination result of Step S810 is NO, or if the information of the attached file can not be converted into facsimile image information and the determination result of Step S810 is NO, the process proceeds to Step S815 and the system controller 1 abandons the received E-mail. Then, the process proceeds to Step S814 in which the network facsimile apparatus 100 waits for the predetermined interval time, and when the interval time is up, the process returns to Step S801 to perform the next E-mail delivery operation.

If the SV 104 does not hold any incoming E-mail for the selected user and the determination result of Step S804 is NO, the system controller 1 stores the present time into the E-mail check time memory 21 in Step S816. The stored present time is referred to as a time when the network facsimile apparatus 100 sends to the SV 104 an inquiry asking if the SV 104 holds the E-mails addressed to the selected user. Then, the process proceeds to Step S814 in which the network facsimile apparatus 100 waits for the predetermined interval time, and when the interval time is up, the process returns to Step S801 to perform the next E-mail delivery operation.

In this way, the network facsimile apparatus 100 is capable of performing the E-mail-in-facsimile-image delivery operation with the restriction according to the priority information placed in the header of E-mails. By this function of the network facsimile apparatus 100, it becomes possible for the user to receive only important E-mails according to the priority values provided.

Next, a fourth exemplary procedure of the E-mail delivery operation by the network facsimile apparatus 100 having the E-mail delivery information table 120 instead of the E-mail delivery information table 20 is explained with reference to FIG. 14. The fourth exemplary procedure is to restrict delivery of E-mails according to the mail address information placed in the header of received E-mails.

Figure 14B:
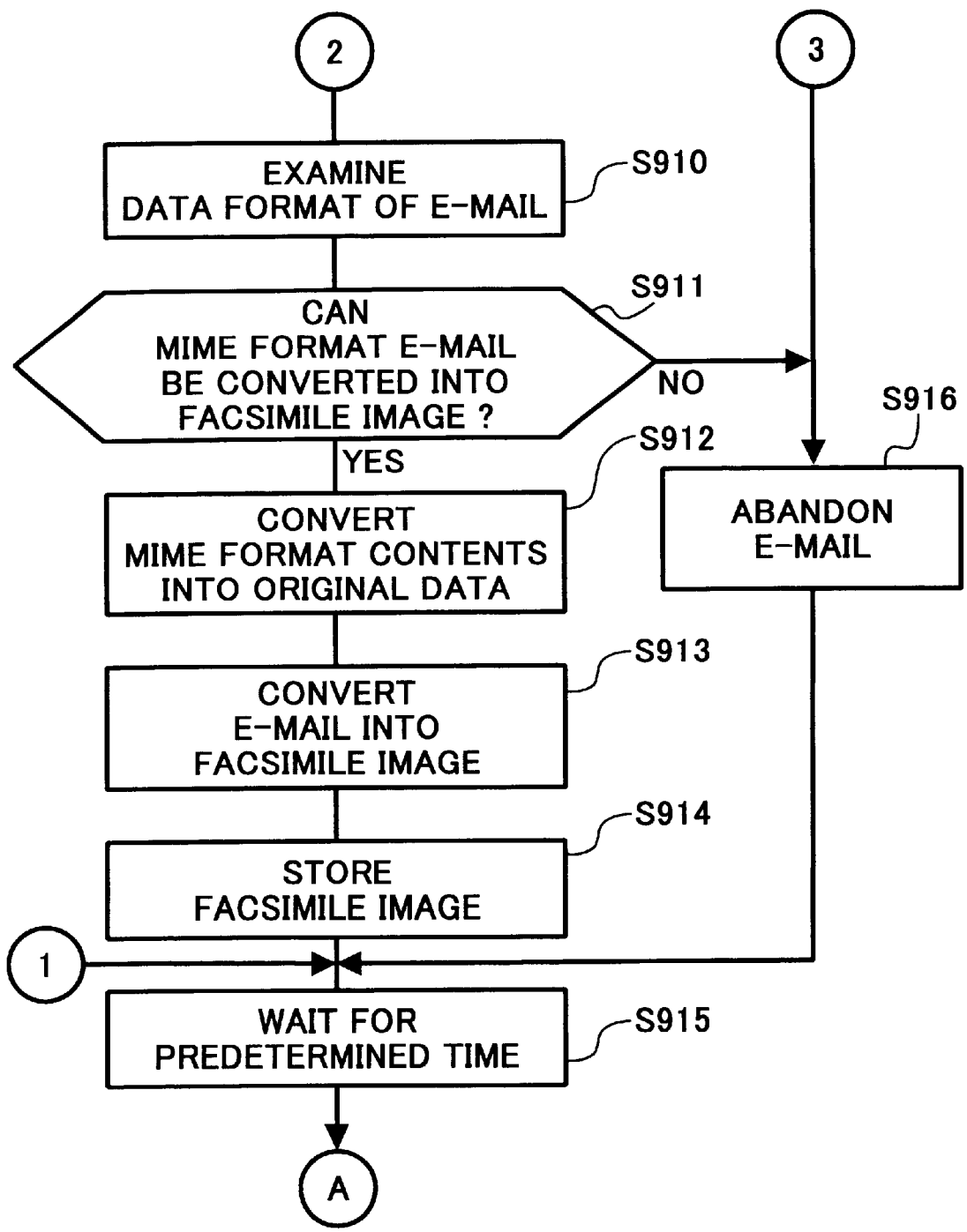
FIG. 14 is a flowchart explaining another exemplary procedure of the electronic-mail delivery operation using a sender's mail address of the modified information table of FIG. 9.

In the flowchart of FIG. 14, it is understood that the network facsimile apparatus 100 has started the E-mail delivery operation through the procedure of FIG. 6, selecting one of the registered users. In Step S901 of FIG. 14, the system controller 1 obtains the various information including the sender's mail address 120*j* for one of the registered users from the E-mail delivery information table 120. Then, in Step S902, the system controller 1 instructs the LAN data transmission controller 13 to connect to the SV 104, via the LAN interface 12, through a predetermined communications procedure, e.g. POP (post office protocol) procedure, using the user name 22 and the pass word 23 of the user from the E-mail delivery information table 120. In Step S903, the system controller 1 subsequently sends to the SV 104 an inquiry for incoming E-mails addressed to the user.

In Step S904, the system controller 1 determines the result of inquiry of Step S903. If the SV 104 holds such an incoming E-mail and the determination result of Step S904 is YES, the system controller 1 sends a request for transmitting the incoming E-mail held for the selected user and receives them, in Step S905. At this time, the SV 104 does not delete the transmitted E-mail and maintains to hold it even after the transmission. Then, in Step S906, the system controller 1 stores the present time into the E-mail check time memory 21. The stored present time is referred to as a time when the network facsimile apparatus 100 receives the E-mail from the SV 104. Based on this time, the network facsimile apparatus 100 can determine a time to perform the next E-mail delivery operation.

After setting the present time into the E-mail check time memory 21, the process proceeds to Step S907 and the system controller 1 checks if there is information of the sender's mail address in the E-mail delivery control information table 120. If there is information of the sender's mail address in the E-mail delivery control information table 120 and the check result of Step S907 is YES, the system controller 1 examines in Step S908 if the information of the sender's mail address in the E-mail delivery control information table 120 is included in a value of the "From" field in the header of the received E-mail. Then, the examination result is determined in Step S909. On the other hand, if there is no information of the sender's mail address in the E-mail delivery control information table 120 and the check result of Step S907 is NO, the system controller 1 does not perform the examination of Step S908 and the process proceeds to Step S910 described below.

If the information of the sender's mail address in the E-mail delivery control information table 120 is included in the value of "From" field in the header of the received E-mail and the determination result of Step S909 is YES, the system controller 1 examines the contents of the received E-mail in Step S910. More specifically, when the received E-mail is the MIME format E-mail, for example, the system controller 1 examines in Step S910 if the information of the file attached to the contents of the E-mail can be converted into facsimile image information by checking a file name extension of the received MIME format E-mail. Then, the examination result is determined in Step S911.

If the information of the attached file can be converted into facsimile image information and the determination result of Step S911 is YES, the process proceeds to Step S912 where the information of the attached file is converted back into the original contents and, in Step S913, the whole E-mail information including the original contents is then implemented into information in corresponding facsimile image information. In this process, an TTI (transmitter terminal identification) located at the top of the facsimile image information may include information for indicating a sending terminal based on the value of the "From" field and a destination terminal based on the value of the "To" field.

Then, in Step S914, the system controller 1 starts the E-mail-in-facsimile-image delivery operation, which is described above with reference to FIG. 7, so as to transmit the above-mentioned facsimile image information, converted from the E-mail, to a facsimile terminal designated by the facsimile number 20d of the E-mail delivery information table 120. Then, in Step S915, the network facsimile apparatus 100 waits for the predetermined interval time specified in the interval 20e of the E-mail delivery information table 120, based on the time registered in the E-mail check time memory 21. When the interval time is up, the process returns to Step S901 to perform the next E-mail delivery operation.

If the information of the sender's mail address in the E-mail delivery control information table 120 is not included in the value of "From" field in the header of the received E-mail and the determination result of Step S909 is NO, or if the information of the attached file can not be converted into facsimile image information and the determination result of Step S911 is NO, the process proceeds to Step S916 and the system controller 1 abandons the received E-mail. Then, the process proceeds to Step S915 in which the network facsimile apparatus 100 waits for the predetermined interval time, and when the interval time is up, the process returns to Step S901 to perform the next E-mail delivery operation.

If the SV 104 does not holds any incoming E-mail for the selected user and the determination result of Step S904 is NO, the system controller 1 stores the present time into the E-mail check time memory 21 in Step S917. The stored present time is referred to as a time when the network facsimile apparatus 100 sends to the SV 104 an inquiry if the SV 104 holds the E-mails addressed to the selected user. Then, the process proceeds to Step S915 in which the network facsimile apparatus 100 waits for the predetermined interval time, and when the interval time is up, the process returns to Step S901 to perform the next E-mail delivery operation.

In this way, the network facsimile apparatus 100 is capable of performing the E-mail-in-facsimile-image delivery operation with the restriction according to the previously registered information of the sender's mail address and the information placed in the header of received E-mails. By this function of the network facsimile apparatus 100, it becomes possible for the user to receive only important E-mails according to the registered sender's mail address.

Next, an exemplary procedure for remotely changing information of the E-mail delivery control information table, provided to the network facsimile apparatus 100, from communications equipment such as an ordinary telephone configured with a tone dialing through the PSTN 120 rather than from other network facsimile apparatus 100 or the CLs 103 will be explained with reference to FIGS. 15 and 16.

Figure 15:
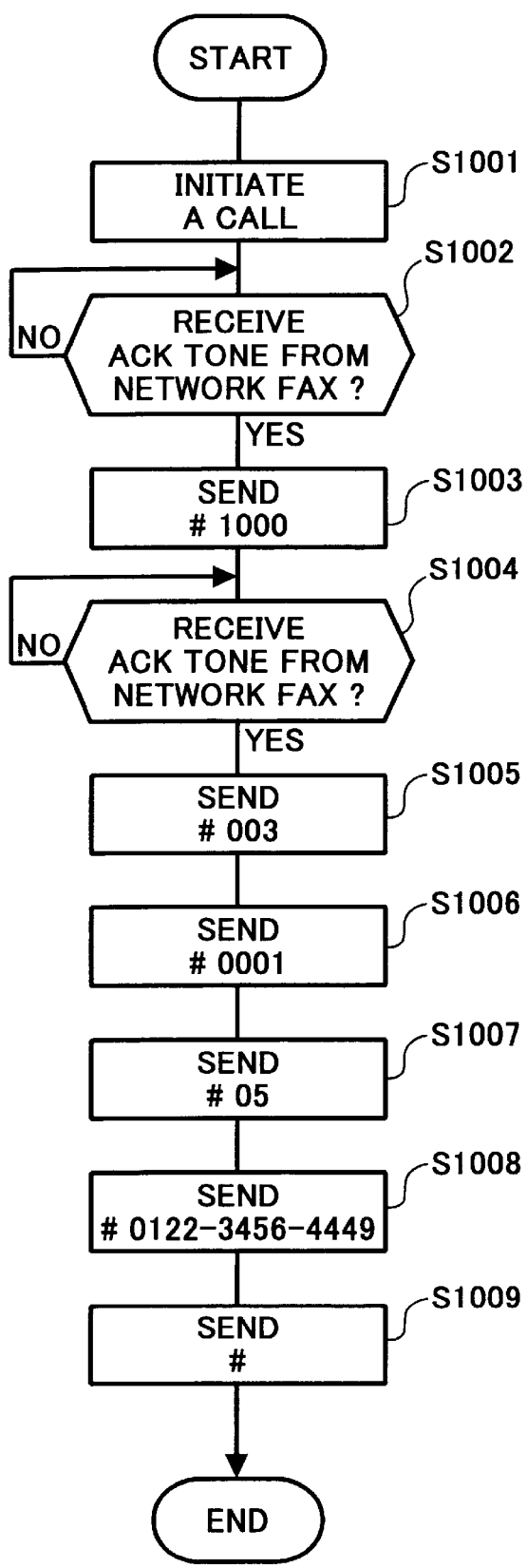
FIG. 15 is a flowchart explaining an exemplary procedure for remotely instructing the network facsimile apparatus to change in formation of the electronic-mail delivery control information table.

The flowchart of FIG. 15 explains an exemplary operation for remotely sending commands from an ordinary telephone configured with a tone dialing through the PSTN 120 in order to change information of the E-mail delivery control information table of the network facsimile apparatus 100. In Step S1001 of FIG. 15, the user initiates a call to the network facsimile apparatus 100. In Step S1002, the user checks the responding tone from the network facsimile apparatus 100. In Step S1003, the user input "#1000" that represents a command for setting the network facsimile apparatus 100 into a command receiving mode. In Step S1004, the user checks the responding tone for indicating that the network facsimile apparatus 100 is ready to receive commands.

Then, through Steps S1005–S1009, the user sequentially sends the respective commands: "#003" for requesting changes of information of the E-mail delivery control information table; "#0001" for representing the user ID (identification) information; "#05" for requesting a change of facsimile number; "#012-3456-4449," for example, for representing a new facsimile number to be registered in the E-mail delivery control information table; and "#" for indicating an end of command transmission.

After this operation, the network facsimile apparatus 100 has the changed E-mail delivery control information table. That is, the registered facsimile number is changed to 0122-3456-4449 in the column where the ID value is set to 0001 in the E-mail delivery control information table of the network facsimile apparatus 100. Although the item for change in this exemplary operation is the facsimile number, other items (e.g., on/off flag, priority level) can also be changed in a similar manner.

The flowchart of FIG. 16 explains an exemplary operation for receiving the above-described commands for hanging the information of the E-mail delivery control information table from communications equipment such as an ordinary telephone configured with a tone dialing through the PSTN 120. Upon receiving a call from an ordinary telephone configured with a tone dialing through the PSTN 120 in Step S1101, the network facsimile apparatus 100 instructs the Group 3 facsimile modem 10 to send an acknowledging tone to the telephone in Step S1102 and to perform a predetermined pre-transmission operation with the called telephone in Step S1103. During the pre-transmission operation, the system controller 1 checks if the Group 3 facsimile modem 10 receives predetermined facsimile signals from the called telephone. The check result is determined in Step S1104.

If the Group 3 facsimile modem 10 receives no predetermined facsimile signals and the determination result of Step S1104 is NO, the process proceeds to Step S1105 and the system controller 1 checks if the Group 3 facsimile modem 10 receives the command "#1000" for setting the network facsimile apparatus 100 into the command receiving mode. If the Group 3 facsimile modem 10 receives the command "#1000" for setting the network facsimile apparatus 100 into the command receiving mode and the check result of Step S1106 YES, the process proceeds to Step S1107 and the system controller 1 instructs the Group 3 facsimile modem 10 to receive the following incoming commands. Then, in Step S1107, the system controller 1 performs operations corresponding to the received commands. The process then ends. If the Group 3 facsimile modem 10 receives no command "#1000" and the check result of Step S1106 is NO, the process also ends.

If the Group 3 facsimile modem 10 receives predetermined facsimile signals and the determination result of Step S1104 is YES, the Group 3 facsimile modem 10 executes the modem training procedure in Step S1108 and performs a predetermined facsimile transmission procedure in Step S1109.

After the facsimile transmission procedure, the Group 3 facsimile modem 10 executes the predetermined post-transmission operation in Step S1110 and disconnects the line in Step S1111. Then, the process ends.

In this way, the network facsimile apparatus 100 can be configured in such a way that the user can change the information of the E-mail delivery control information table of the network facsimile apparatus 100 remotely from communications equipment such as, for example, an ordinary telephone through the PSTN 120. By this remote function, the user can arrange to receive E-mails at any location of an arbitrary destination facsimile terminal.

Although the E-mails determined as not to be delivered is abandoned in each procedure, they are not abandoned from the SV 104 when being transferred to the network facsimile apparatus 100 in the above-described examples. Therefore, the users can properly receive the non-delivered E-mails afterwards.

The embodiment of the present application may be conveniently implemented using a conventional general purpose digital computer programmed according to the teachings of the present specification, as will be apparent to those skilled in the art. Appropriate software coding can readily be prepared based on the teachings of the present disclosure, as will be apparent to those skilled in the art. The present application may also be implemented by the preparation of application specific integrated circuits or by interconnecting an appropriate network of conventional component circuits, as will be readily apparent to those skilled in the art.

This application is based on Japanese Patent Application No. JPAP09-230515 filed Aug. 13, 1997, the entire contents of which are herein incorporated by reference.

Numerous additional modifications and variations of the present application are possible in light of the above teachings. It is therefore to be understood that within the scope of the appended claims, the present application may be practiced otherwise than as specifically described herein.

What we claim is:

1. A data terminal which is coupled to a local area network and a public switched telephone network, comprising:

a first communications device that transmits and receives electronic mails through said local area network;

a second communications device that transmits and receives facsimile image information through said public switched telephone network;

a memory that stores a plurality of electronic-mail delivery control information sets, each information set being uniquely assigned to each user and including user identifiers necessary for the user to access a mail server and to receive electronic mails for the user therefrom, at least one facsimile number indicating where to deliver the electronic mails, and a flag for indicating whether an electronic-mail delivery operation is required, the flag for each control information set capable of being set by its respective assigned user, each assigned user being an electronic mail recipient; and a delivery controller that controls said first and second communications devices and said memory and that allows said data terminal to perform said electronic-mail delivery operation in accordance with information of said electronic-mail delivery control information sets, wherein during said electronic-mail delivery operation, said data terminal periodically accesses the mail server using said user identifiers and downloads electronic mail for the user from said mail server when said flag indicates that said electronic-mail delivery operation is required, and said data terminal converts the electronic mail downloaded from said mail server into facsimile image information and transmits the facsimile image information to at least one communications terminal that has a facsimile communications function using said at least one facsimile number included in said user identifiers.

2. The data terminal of claim 1, wherein each of said electronic-mail delivery control information sets further includes a transmission time and, during said electronic-mail delivery operation, said data terminal temporarily holds said electronic mails received from said mail server before converting said electronic mails into facsimile image information for a time period until a time becomes equal to said transmission time.

3. The data terminal of claim 1, wherein each of said electronic-mail delivery control information sets further includes a priority level and, during said electronic-mail delivery operation, said data terminal transmits said electronic mails to said at least one communications terminal only when said priority level of said electronic-mail delivery control information set for the user is below priority information provided in said electronic mails.

4. The data terminal of claim 1, wherein each of said electronic-mail delivery control information sets further includes a sender's identifier and, during said electronic-mail delivery operation, said data terminal transmits said electronic mails to said at least one communications terminal only when said sender's identifier of said electronic-mail delivery control information set for the user is identical to sender's identification information provided in said electronic mails.

5. The data terminal of claim 1, wherein each of said electronic-mail delivery control information sets further includes a mail server designation and, during said electronic-mail delivery operation, said data terminal accesses a mail server in accordance with said mail server designation of said electronic-mail delivery control information set for the user and receives electronic mails for the user from said designated mail server.

6. The data terminal of claim 1, wherein, when converting said electronic mail for the user into facsimile image information, said data terminal also converts a binary data file attached to said electronic mail into facsimile image information.

7. The data terminal of claim 1, wherein, when converting said electronic mail for the user into facsimile image information, said data terminal also converts information which is included in a header of said electronic mail into facsimile image information.

8. The data terminal of claim 1, wherein said delivery controller changes contents of said electronic-mail delivery control information sets in accordance with information which are sent from a communications terminal.

9. The data terminal of claim 8, wherein said communications terminal is a facsimile apparatus.

10. The data terminal of claim 8, wherein said communications terminal is a telephone.

11. The data terminal of claim 1, wherein said delivery controller performs said electronic-mail delivery operation for the users registered in said electronic-mail delivery control information sets at predetermined time intervals.

12. The data terminal of claim 1, wherein each of said electronic-mail delivery control information sets further includes an individual interval time and, and said data terminal performs said electronic-mail delivery operation at individual intervals for each user in accordance with said individual interval time of said electronic-mail delivery control information set for the user.

13. A data terminal which is coupled to a local area network and a public switched telephone network, comprising:

first communications means for transmitting and receiving electronic mails through said local area network;

second communications means for transmitting and receiving facsimile image information through said public switched telephone network;

data storing means for storing data representing a plurality of electronic-mail delivery control information sets, each information set being uniquely assigned to each user and including user identifiers necessary for the user to access a mail server and to receive electronic mails for the user therefrom, at least one facsimile number indicating where to deliver the electronic mails, and a flag for indicating whether an electronic-mail delivery operation is required, the flag for each control information set capable of being set by its respective assigned user, each assigned user being an electronic mail recipient; and delivery controlling means for controlling said first and second communications means and said data storing means and for allowing said data terminal to perform said electronic-mail delivery operation in accordance with information of said electronic-mail delivery control information sets, wherein during said electronic-mail delivery operation, said data terminal periodically accesses the mail server using said user identifiers and downloads electronic mail for the user from said mail server when said flag indicates that said electronic-mail delivery operation is required, and said data terminal converts the electronic mail downloaded from said mail server into facsimile image information and transmits the facsimile image information to at least one communications terminal that has a facsimile communications function using said at least one facsimile number included in said user identifiers.

14. The data terminal of claim 13, wherein each of said electronic-mail delivery control information sets further includes a transmission time and, during said electronic-mail delivery operation, said data terminal temporarily holds said electronic mails received from said mail server before converting said electronic mails into facsimile image information for a time period until a time becomes equal to said transmission time.

15. The data terminal of claim 13, wherein each of said electronic-mail delivery control information sets further includes a priority level and, during said electronic-mail delivery operation, said data terminal transmits said electronic mails to said at least one communications terminal only when said priority level of said electronic-mail delivery control information set for the user is below priority information provided in said electronic mails.

16. The data terminal of claim 13, wherein each of said electronic-mail delivery control information sets further includes a sender's identifier and, during said electronic-mail delivery operation, said data terminal transmits said electronic mails to said at least one communications terminal only when said sender's identifier of said electronic-mail delivery control information set for the user is identical to sender's identification information provided in said electronic mails.

17. The data terminal of claim 13, wherein each of said electronic-mail delivery control information sets further includes a mail server designation and, during said electronic-mail delivery operation, said data terminal accesses a mail server in accordance with said mail server designation of said electronic-mail delivery control information set for the user and receives electronic mails for the user from said designated mail server.

18. The data terminal of claim 13, wherein, when converting said electronic mail for the user into facsimile image information, said data terminal also converts a binary data file attached to said electronic mail into facsimile image information.

19. The data terminal of claim 13, wherein, when converting said electronic mail for the user into facsimile image information, said data terminal also converts information which is included in a header of said electronic mail into facsimile image information.

20. The data terminal of claim 13, wherein said delivery controlling means changes contents of said electronic-mail delivery control information sets in accordance with information which are sent from a communications terminal.

21. The data terminal of claim 20, wherein said communications terminal is a facsimile apparatus.

22. The data terminal of claim 20, wherein said communications terminal is a telephone.

23. The data terminal of claim 13, wherein said delivery controlling means performs said electronic-mail delivery operation for the users registered in said electronic-mail delivery control information sets at predetermined time intervals.

24. The data terminal of claim 13, wherein each of said electronic-mail delivery control information sets further includes an individual interval time and, and said data terminal performs said electronic-mail delivery operation at individual intervals for each user in accordance with said individual interval time of said electronic-mail delivery control information set for the user.

25. A method of delivering electronic mails at locations of at least one arbitrary communications terminal having a facsimile communications function, said method comprising the steps of:

storing data representing a plurality of electronic-mail delivery control information sets, each information set being uniquely assigned to each user and including user identifiers necessary for the user to access a mail server and to receive electronic mails for the user therefrom, at least one facsimile number indicating where to deliver the electronic mails, and a flag for indicating whether an electronic-mail delivery operation is required, the flag for each control information set capable of being set by its respective assigned user, each assigned user being an electronic mail recipient;

starting said electronic-mail delivery operation in accordance with information of said electronic-mail delivery control information sets;

periodically accessing the mail server using said user identifiers when said flag indicates that said electronic-mail delivery operation is required;

downloading electronic mail for the user from said mail server;

converting said electronic mail downloaded from said mail server into facsimile image information; and transmitting said facsimile image information to said at least one communications terminal using said at least one facsimile number included in said user identifiers.

26. The method of claim 25, wherein each of said electronic-mail delivery control information sets further includes a transmission time, and said method further comprising a step of temporarily holding said electronic mails received from said mail server before said converting step for a time period until a time becomes equal to said transmission time.

27. The method of claim 25, wherein each of said electronic-mail delivery control information sets further includes a priority level and said transmitting step is performed only when said priority level of said electronic-mail delivery control information set for the user is below priority information provided in said electronic mails.

28. The method of claim 25, wherein each of said electronic-mail delivery control information sets further includes a sender's identifier and said transmitting step is performed only when said sender's identifier of said electronic-mail delivery control information set for the user is identical to sender's identification information provided in said electronic mails.

29. The method of claim 25, wherein each of said electronic-mail delivery control information sets further includes a mail server designation, and wherein said accessing step accesses the mail server in accordance with said mail server designation of said electronic-mail delivery control information set for the user and said receiving step receives electronic mails for the user from said designated mail server.

30. The method of claim 25, wherein said converting step also converts a binary data file attached to said electronic mail into facsimile image information.

31. The method of claim 25, wherein said converting step also converts information which is included in a header of said electronic mail into facsimile image information.

32. The method of claim 25, wherein contents of said electronic-mail delivery control information sets are changed in accordance with information which are sent from a communications terminal.

33. The method of claim 32, wherein said communications terminal performs a facsimile communication.

34. The method of claim 32, wherein said communications terminal performs a telephone communication.

35. The method of claim 25, wherein said electronic-mail delivery operation is performed at predetermined time intervals.

36. The method of claim 25, wherein each of said electronic-mail delivery control information sets further includes an individual interval time and said electronic-mail delivery operation is performed at individual intervals for each user in accordance with said individual interval time of said electronic-mail delivery control information set for the user.

37. An electronic communications system, comprising:

a plurality of facsimile terminals coupled to a public switched telephone network;

a plurality of domains connected with each other, each domain comprising a mail server and a data terminal which is coupled to a local area network included in said domain and to said public switched telephone network, said data terminal comprising:

a first communications device that transmits and receives electronic mails through said local area network;

a second communications device that transmits and receives facsimile image information through said public switched telephone network;

a memory that stores a plurality of electronic-mail delivery control information sets, each information set being uniquely assigned to each user and including user identifiers necessary for the user to access said mail server and to receive electronic mails for the user therefrom, at least one facsimile number indicating where to deliver the electronic mails, and a flag for indicating whether an electronic-mail delivery operation is required, the flag for each control information set capable of being set by its respective assigned user, each assigned user being an electronic mail receipient; and a delivery controller that controls said first and second communications devices and said memory and that allows said data terminal to perform said electronic-mail delivery operation in accordance with information of said electronic-mail delivery control information sets, wherein during said electronic-mail delivery operation, said data terminal periodically accesses said mail server using said user identifiers and downloads electronic mail for the user from said mail server when said flag indicates that said electronic-mail delivery operation is required, and said data terminal converts the electronic mail downloaded from said mail server into facsimile image information and transmits the facsimile image information to at least one facsimile terminal among said plurality of said facsimile terminals using said at least one facsimile number included in said-user identifiers.

38. The system of claim 37, wherein each of said electronic-mail delivery control information sets further includes a transmission time and, during said electronic-mail delivery operation, said data terminal temporarily holds said electronic mails received from said mail server before converting said electronic mails into facsimile image information for a time period until a time becomes equal to said transmission time.

39. The system of claim 37, wherein each of said electronic-mail delivery control information sets further includes a priority level and, during said electronic-mail delivery operation, said data terminal transmits said electronic mails to said at least one facsimile terminal among said plurality of said facsimile terminal only when said priority level of said electronic-mail delivery control information set for the user is below priority information provided in said electronic mails.

40. The system of claim 37, wherein each of said electronic-mail delivery control information sets further includes a sender's identifier and, during said electronic-mail delivery operation, said data terminal transmits said electronic mails to said at least one facsimile terminal among said plurality of said facsimile terminal only when said sender's identifier of said electronic-mail delivery control information set for the user is identical to sender' identification information provided in said electronic mails.

41. The system of claim 37, wherein each of said electronic-mail delivery control information sets further includes a mail server designation and, during said electronic-mail delivery operation, said data terminal accesses a mail server in accordance with said mail server designation of said electronic-mail delivery control information set for the user and receives electronic mails for the user from said designated mail server.

42. The system of claim 37, wherein, when converting said electronic mail for the user into facsimile image information, said data terminal also converts a binary data file attached to said electronic mail into facsimile image information.

43. The system of claim 37, wherein, when converting said electronic mail for the user into facsimile image information, said data terminal also converts information which is included in a header of said electronic mail into facsimile image information.

44. The system of claim 37, wherein said delivery controller changes contents of said electronic-mail delivery control information sets in accordance with information which are sent from a communications terminal.

45. The system of claim 44, wherein said communications terminal is one of said plurality of said facsimile apparatus.

46. The system of claim 44, wherein said communications terminal is a telephone coupled to said public switched telephone network.

47. The system of claim 37, wherein said delivery controller performs said electronic-mail delivery operation for the users registered in said electronic-mail delivery control information sets at predetermined time intervals.

48. The system of claim 37, wherein each of said electronic-mail delivery control information sets further includes an individual interval time and said data terminal performs said electronic-mail delivery operation at individual intervals for each user in accordance with said individual interval time of said electronic-mail delivery control information set for the user.

49. An electronic communications system, comprising:
a plurality of facsimile terminals coupled to a public switched telephone network; and
a plurality of domains connected with each other through Internet, each domain comprising:
a mail server receiving and storing electronic mails; and
a data terminal which is coupled to a local area network included in said domain and to said public switched telephone network, said data terminal comprising:
first communications means for transmitting and receiving electronic mails through said local area network;
second communications means for transmitting and receiving facsimile image information through said public switched telephone network;
data storing means for storing a plurality of electronic-mail delivery control information sets, each information set being uniquely assigned to each user and including user identifiers necessary for the user to access said mail server and to receive electronic mails for the user therefrom, at least one facsimile number indicating where to deliver the electronic mails, and a flag for indicating whether an electronic-mail delivery operation is required, the flag for each control information set capable of being set by its respective assigned user, each assigned user being an electronic mail receipient; and
delivery controlling means for controlling said first and second communications means and said data storing means and for allowing said data terminal to perform said electronic-mail delivery operation in accordance with information of said electronic-mail delivery control information sets,
wherein during said electronic-mail delivery operation, said data terminal periodically accesses said mail server using said user identifiers and downloads electronic mail for the user from said mail server when said flag indicates that said electronic-mail delivery operation is required, and said data terminal converts the electronic mail downloaded from said mail server into facsimile image information and transmits the facsimile image information to at least one facsimile terminal among said plurality of said facsimile terminals using said at least one facsimile number included in said user identifiers.

50. The system of claim 49, wherein each of said electronic-mail delivery control information sets further includes a transmission time and, during said electronic-mail delivery operation, said data terminal temporarily holds said electronic mails received from said mail server before converting said electronic mails into facsimile image information for a time period until a time becomes equal to said transmission time.

51. The system of claim 49, wherein each of said electronic-mail delivery control information sets further includes a priority level and, during said electronic-mail delivery operation, said data terminal transmits said electronic mails to said at least one facsimile terminal among said plurality of said facsimile terminal only when said priority level of said electronic-mail delivery control information set for the user is below priority information provided in said electronic mails.

52. The system of claim 49, wherein each of said electronic-mail delivery control information sets further includes a sender's identifier and, during said electronic-mail delivery operation, said data terminal transmits said electronic mails to said at least one facsimile terminal among said plurality of said facsimile terminal only when said sender's identifier of said electronic-mail delivery control information set for the user is identical to sender' identification information provided in said electronic mails.

53. The system of claim 49, wherein each of said electronic-mail delivery control information sets further includes a mail server designation and, during said electronic-mail delivery operation, said data terminal accesses a mail server in accordance with said mail server designation of said electronic-mail delivery control information set for the user and receives electronic mails for the user from said designated mail server.

54. The system of claim 49, wherein, when converting said electronic mail for the user into facsimile image information, said data terminal also converts a binary data file attached to said electronic mail into facsimile image information.

55. The system of claim 49, wherein, when converting said electronic mail for the user into facsimile image information, said data terminal also converts information which is included in a header of said electronic mail into facsimile image information.

56. The system of claim 49, wherein said delivery controlling means changes contents of said electronic-mail delivery control information sets in accordance with information which are sent from a communications terminal.

57. The system of claim 56, wherein said communications terminal is one of said plurality of said facsimile apparatus.

58. The system of claim 56, wherein said communications terminal is a telephone coupled to said public switched telephone network.

59. The system of claim 49, wherein said delivery controlling means performs said electronic-mail delivery operation for the users registered in said electronic-mail delivery control information sets at predetermined time intervals.

60. The system of claim 49, wherein each of said electronic-mail delivery control information sets further includes an individual interval time and said data terminal performs said electronic-mail delivery operation at individual intervals for each user in accordance with said individual interval time of said electronic-mail delivery control information set for the user.

61. A method of delivering electronic mails at locations of at least one arbitrary communications terminal having a facsimile communications function, said method comprising the steps of:

storing a plurality of electronic-mail delivery control information sets, each information set being uniquely assigned to each user and including user identifiers necessary for the user to access a mail server and to receive electronic mails for the user therefrom, at least one facsimile number indicating where to deliver the electronic mails, and a flag for indicating whether an electronic-mail delivery operation is required, the flag for each control information set capable of being set by its respective assigned user, each assigned user being an electronic mail receipient;

starting said electronic-mail delivery operation in accordance with information of said electronic-mail delivery control information sets;

periodically accessing said mail server using said user identifiers when said flag indicates that said electronic-mail delivery operation is required;

downloading electronic mail for the user from said mail server;

converting the electronic mail downloaded from said mail server into facsimile image information; and transmitting the facsimile image information to at least one facsimile terminal among a plurality of facsimile terminals using said at least one facsimile number included in said user identifiers.

62. The method of claim 61, wherein each of said electronic-mail delivery control information sets further includes a transmission time, and said method further comprising a step of temporarily holding said electronic mails received from said mail server before said converting step for a time period until a time becomes equal to said transmission time.

63. The method of claim 61, wherein each of said electronic-mail delivery control information sets further includes a priority level and said transmitting step is performed only when said priority level of said electronic-mail delivery control information set for the user is below priority information provided in said electronic mails.

64. The method of claim 61, wherein each of said electronic-mail delivery control information sets further includes a sender's identifier and said transmitting step is performed only when said sender's identifier of said electronic-mail delivery control information set for the user is identical to sender' identification information provided in said electronic mails.

65. The method of claim 61, wherein each of said electronic-mail delivery control information sets further includes a mail server designation, and wherein said accessing step accesses a mail server in accordance with said mail server designation of said electronic-mail delivery control information set for the user and said receiving step receives electronic mails for the user from said designated mail server.

66. The method of claim 61, wherein said converting step also converts a binary data file attached to said electronic mail into facsimile image information.

67. The method of claim 61, wherein said converting step also converts information which is included in a header of said electronic mail into facsimile image information.

68. The method of claim 61, wherein contents of said electronic-mail delivery control information sets are changed in accordance with information which are sent from a communications terminal.

69. The method of claim 68, wherein said communications terminal performs a facsimile communication.

70. The method of claim 68, wherein said communications terminal performs a telephone communication.

71. The method of claim 61, wherein said electronic-mail delivery operation is performed at predetermined time intervals.

72. The method of claim 61, wherein each of said electronic-mail delivery control information sets further includes an individual interval time and said electronic-mail delivery operation is performed at individual intervals for each user in accordance with said individual interval time of said electronic-mail delivery control information set for the user.

\* \* \* \* \*